United States Patent
Ito et al.

(10) Patent No.: US 7,966,810 B2
(45) Date of Patent: Jun. 28, 2011

(54) CONTROL DEVICE AND EXHAUST PURIFICATION METHOD OF INTERNAL COMBUSTION ENGINE

(75) Inventors: Hiroshi Ito, Susono (JP); Kotaro Hayashi, Mishima (JP); Tetsuya Yamashita, Gotenba (JP); Shinichi Takeshima, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 760 days.

(21) Appl. No.: 11/886,547

(22) PCT Filed: Mar. 17, 2006

(86) PCT No.: PCT/JP2006/305883
§ 371 (c)(1),
(2), (4) Date: Mar. 3, 2008

(87) PCT Pub. No.: WO2006/098512
PCT Pub. Date: Sep. 21, 2006

(65) Prior Publication Data
US 2009/0229247 A1  Sep. 17, 2009

(30) Foreign Application Priority Data

Mar. 18, 2005 (JP) ................................. 2005-080058
Mar. 18, 2005 (JP) ................................. 2005-080064

(51) Int. Cl.
| | |
|---|---|
| F01N 3/00 | (2006.01) |
| F02B 1/12 | (2006.01) |
| F02B 75/02 | (2006.01) |
| F02B 19/00 | (2006.01) |
| F02B 51/00 | (2006.01) |
| F02D 19/10 | (2006.01) |
| F02D 7/00 | (2006.01) |
| F02P 23/00 | (2006.01) |
| F02M 7/00 | (2006.01) |
| F02M 51/00 | (2006.01) |
| G06F 19/00 | (2011.01) |
| G06F 17/00 | (2006.01) |
| G06F 7/00 | (2006.01) |
| G06G 7/70 | (2006.01) |
| G05D 1/00 | (2006.01) |
| B60T 7/12 | (2006.01) |

(52) U.S. Cl. .................... 60/285; 123/27 R; 123/143 B; 123/435; 123/481; 123/493; 123/536; 701/102; 701/103; 701/104; 701/110

(58) Field of Classification Search ................ 123/27 R, 123/143 B, 435, 481, 493, 536; 701/102–104, 701/110
See application file for complete search history.

(56) References Cited

U.S. PATENT DOCUMENTS

2005/0031522 A1 * 2/2005 Delaney et al. ............ 423/419.1

FOREIGN PATENT DOCUMENTS

FR            2822893          10/2002
(Continued)

OTHER PUBLICATIONS

Hiroyuki Fukui, et al.: *Particle Size Distribution Measurements in Automotive Exhaust; Present Situation and Issues*, Jari Research Journal, Jun. 2000, vol. 22, No. 6, pp. 5-10.

*Primary Examiner* — Thomas E Denion
*Assistant Examiner* — Michael Carton
(74) *Attorney, Agent, or Firm* — Kenyon & Kenyon LLP

(57) ABSTRACT

It is suppressed that nanoparticles generated in an internal combustion engine are discharged into the atmosphere. In a cylinder or an exhaust system of the internal combustion engine, microparticles having a particle diameter larger than that of the nanoparticles are generated, and the nanoparticles generated in the internal combustion engine are adsorbed by the microparticles, thereby increasing the diameter of the nanoparticles. The microparticles can be generated in the cylinder as the soot, for example. Additionally, by providing a carbon microparticle generation device in the exhaust system, the microparticles can be generated, too. By making the nanoparticles adsorbed by the microparticles and increasing the diameter of the nanoparticles, discharging of the nanoparticles can be suppressed.

13 Claims, 13 Drawing Sheets

FOREIGN PATENT DOCUMENTS

| | | |
|---|---|---|
| JP | 63-69760 | 3/1988 |
| JP | 09-273628 | 10/1997 |
| JP | 10-54268 | 2/1998 |
| JP | 2841798 B2 | 10/1998 |
| JP | 2000097078 A | 4/2000 |
| JP | 2001-041024 A | 2/2001 |
| JP | 2002-364339 A | 12/2002 |
| JP | 2003-035128 A | 2/2003 |
| JP | 2003-172130 A | 6/2003 |
| JP | 2004-076669 | 3/2004 |
| JP | 2005-016483 A | 1/2005 |
| JP | 2005-016502 A | 1/2005 |
| JP | 2005-120964 A | 5/2005 |
| JP | 2005-226473 A | 8/2005 |
| WO | WO 2004/011783 A2 | 2/2004 |
| WO | WO 2005/021940 A1 | 3/2005 |

* cited by examiner

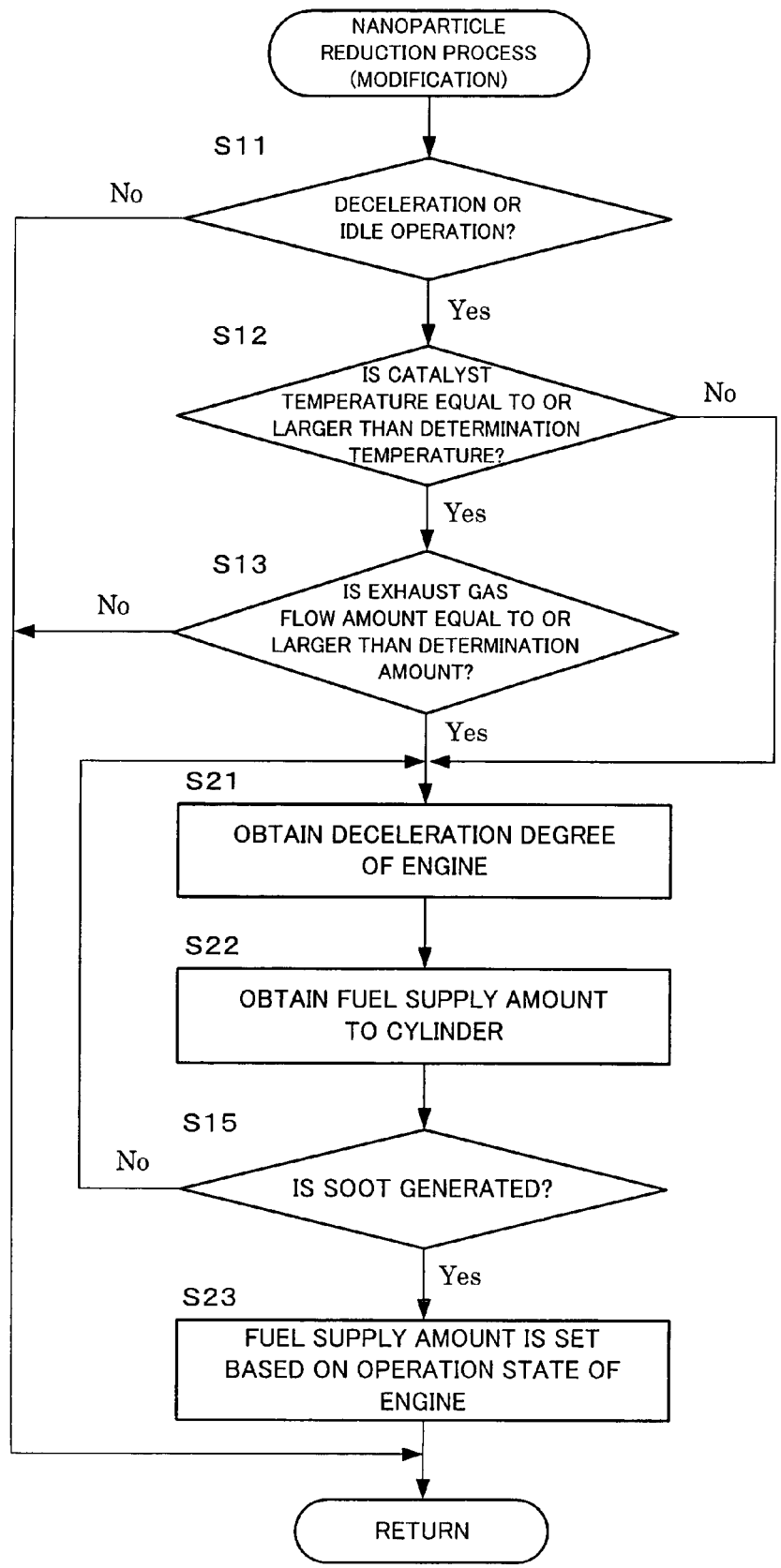

CONTROL DEVICE AND EXHAUST PURIFICATION METHOD OF INTERNAL COMBUSTION ENGINE

This is a 371 national phase application of PCT/JP2006/305883 filed 17 Mar. 2006, claiming priority to Japanese Patent Applications No. 2005-080058 and No. 2005-080064, both filed 18 Mar. 2005, the contents of which are incorporated herein by reference.

TECHNICAL FIELD

The present invention relates to an exhaust purification technique for aggregating particulate matters existing in the exhaust gas of an internal combustion engine.

BACKGROUND TECHNIQUE

Particulate matters are included in the exhaust gas discharged from an internal combustion engine such as a diesel engine. Therefore, it is necessary to provide an exhaust purification device for removing the particulate matters from the exhaust gas in an exhaust passage of the internal combustion engine. A filter is provided in the exhaust purification device, and the particulate matters are caught and collected by the filter. The filter executes a process such as an oxidation treatment to the collected particulate matters.

As an example of a device for purifying the exhaust gas discharged from the internal combustion engine, there is known a device which selectively catches and collects carbon flotation microparticles with using a first ceramic filter holding catalyst components, and which catches and collects the carbon flotation microparticles passed through the first ceramic filter with using a second ceramic filter arranged at a downstream position of the first ceramic filter and holding catalyst components (see Japanese Patent Application Laid-open under No. 2002-364339).

The particulate matter includes microparticles of various sizes, which are roughly divided into particles having a size equal to or smaller than 50 nm (i.e., "nanoparticles") and particles having a size larger than 50 nm (i.e., "microparticles"). The nanoparticle is derived from a high boiling point component in a fuel and lubricating oil element of an internal combustion engine. The nanoparticle is also regarded as a form after the lubricating oil combustion, as an aggregation component of the lubricating oil, or as an aggregation component of the combustion element and non-combustion element. It is known that the exhaust gas discharged from the internal combustion engine includes the nanoparticles (see "JARI Research Journal", June 2000 issue, Volume 22, Number 6, Page 5-10). It is understood that the nanoparticles are caused due to fuel atomization by recent high pressure of fuel injection, due to combustion temperature lowering by an idle (light-load) state of the internal combustion engine and due to aggregation of soluble organic fraction (SOF) by oil suction caused by the decrease of in-cylinder pressure lowering by a vehicle deceleration state.

The particulate matters flow to the filter with the exhaust gas, and are caught and collected by the filter. Then, an oxidation treatment is executed to the particulate matters. However, since the size of the nanoparticles is small, i.e., equal to or smaller than 50 nm, the nanoparticles easily diffuse into the atmosphere, and it is not easy to catch and collect them with using the filter. Namely, since a part of the nanoparticles passes through the ceramic filter, the normal device cannot sufficiently catch and collect the nanoparticles.

Japanese Patent Application Laid-open under No. 2004-76669 discloses such a technique that an electricity discharge device is provided at a downstream position of the filter; the nanoparticles passed through the filter are charged by the discharge of the electricity; the charged nanoparticles are caught and collected with using an electrode; and thereby, the number of nanoparticles is reduced. As background techniques associated with the present invention, there are Japanese Patent Applications Laid-open under No. 10-54268 and No. 09-273628 and Japanese Utility Model Application Laid-open under No. 63-069760.

DISCLOSURE OF INVENTION

It is an object of this invention to provide a control device and an exhaust purification method of an internal combustion engine, capable of suppressing discharging of nanoparticles into the atmosphere.

According to one aspect of the present invention, there is provided a control device of an internal combustion engine including a microparticle control unit which generates microparticles having a particle diameter larger than that of nanoparticles generated in the internal combustion engine, and supplies the generated microparticles to a space in which the nanoparticles exist or a passage in which the nanoparticles move to make the nanoparticles adsorbed by the microparticles.

By the above control device of the internal combustion engine, since the nanoparticles can be adsorbed by the microparticles in the space in which the nanoparticles exist or the passage in which the nanoparticles move, the amount of nanoparticles discharged to the external can be reduced. Namely, by making the nanoparticles adsorbed by the microparticles having the diameter larger than that of the nanoparticles, the amount of discharged nanoparticles having the particle diameter of nanoparticle size can be reduced. Since the microparticles having the diameter larger than that of the nanoparticles can be caught and collected by an exhaust purification device such as a ceramic filter, by providing the exhaust purification device at a downstream position of the internal combustion engine, it can be suppressed that the nanoparticles are discharged into the atmosphere. The space in which the nanoparticles exist is inside of a cylinder, and the passage in which the nanoparticles move is an exhaust passage of the internal combustion engine, for example.

In a manner of the above control device of the internal combustion engine, the microparticle control unit may include an in-cylinder microparticle generation unit which generates the microparticles in a cylinder of the internal combustion engine at a time of deceleration or idle operation of the internal combustion engine.

In this manner, at the time of the deceleration or idle operation of the internal combustion engine, the microparticles can be generated in the cylinder, and the nanoparticles generated in the cylinder can be adsorbed by the microparticles therein. Therefore, the amount of nanoparticles discharged from the cylinder can be reduced. Thus, it can be suppressed that the nanoparticles are discharged into the atmosphere.

In another manner of the above control device of the internal combustion engine, the in-cylinder microparticle generation unit may include: a state determination unit which determines whether or not nanoparticle components derived from lubricating oil are generated in the cylinder at the time of the deceleration or idle operation of the internal combustion engine; and an operation control unit which operates the in-cylinder microparticle generation unit to generate the microparticles in the cylinder, when the state determination unit determines that the nanoparticle components derived from the lubricating oil are generated in the cylinder.

Since the pressure of the cylinder easily becomes lower at the time of the deceleration or idle operation of the internal combustion engine, the lubricating oil is sucked into the cylinder and easily combusts. Thus, the nanoparticle component derived from the lubricating oil is easily generated in the cylinder. Hence, when the state determination unit determines that the nanoparticle components derived from the lubricating oil are generated in the cylinder of the internal combustion engine, the number of nanoparticles discharged from the cylinder is reduced by generating the microparticles in the cylinder and making the nanoparticles adsorbed by the microparticles.

In still another manner of the above control device of the internal combustion engine, the state determination unit may determine a deceleration degree of the internal combustion engine based on a variation of a number of revolutions of the internal combustion engine at the time of the deceleration of the internal combustion engine, and the operation control unit may operate the in-cylinder microparticle generation unit so that, as the deceleration degree determined by the state determination unit becomes larger, more microparticles are generated in the cylinder.

Since the lubricating oil passes through a gap of piston ring to enter the cylinder of the internal combustion engine, as the pressure of the cylinder becomes lower, the lubricating oil more easily enters the cylinder. Particularly, in such a case that the deceleration degree of the internal combustion engine is large, the pressure of the cylinder easily becomes lower, as compared with such a case that the deceleration degree of the internal combustion engine is small. Therefore, the amount of lubricating oil entering the cylinder may increase. Hence, in the case that the deceleration degree of the internal combustion engine is large, the generation number of nanoparticle components derived from the lubricating oil may increase, as compared with such a case that the deceleration degree is small. Then, the generation amount of microparticles is adjusted in accordance with the deceleration degree of the internal combustion engine, and the generation amount of microparticles is appropriately adjusted in correspondence with the generation amount of nanoparticles. Thereby, it can be suppressed that the surplus microparticles are generated, and it can be suppressed that the nanoparticles are discharged into the atmosphere.

In still another manner of the above control device of the internal combustion engine, the state determination unit may determine whether or not the lubricating oil is easily sucked into the cylinder at the time of the deceleration or idle operation of the internal combustion engine, and may estimate that many nanoparticle components derived from the lubricating oil are generated in the cylinder when the state determination unit determines that the lubricating oil is easily sucked into the cylinder.

As described above, since the part of nanoparticles are regarded as the form after the lubricating oil combustion, it is understood that, when the lubricating oil is easily sucked into the cylinder, the amount of lubricating oil suction into the cylinder increases and the amount of lubricating oil combustion in the cylinder also increases. Hence, it can be estimated that many nanoparticle components derived from the lubricating oil are generated.

In still another manner of the above control device of the internal combustion engine, the in-cylinder microparticle generation unit may include a fuel supply unit which supplies fuel to the cylinder. In this manner, by supplying the fuel to the cylinder and combusting the fuel, the soot can be generated in the cylinder as the microparticle.

In still another manner, the above control device of the internal combustion engine may further include a lubricating oil combustion amount reduction unit which reduces an amount of lubricating oil combustion in the cylinder, wherein the operation control unit controls operation, of the lubricating oil combustion amount reduction unit to reduce the amount of lubricating oil combustion in the cylinder at the time of the deceleration or idle operation of the internal combustion engine. In this case, since the amount of lubricating oil combustion in the cylinder can be reduced by the lubricating oil combustion amount reduction unit, the generation amount of nanoparticle components derived from the lubricating oil can be reduced. Therefore, the amount of nanoparticles generated in the cylinder can be reduced, and the amount of nanoparticles discharged from the cylinder can be further reduced.

In still another manner of the above control device of the internal combustion engine, an exhaust purification catalyst having an oxidizing capability may be provided in an exhaust passage of the internal combustion engine, and at the time of the deceleration or idle operation of the internal combustion engine, the operation control unit may operate the in-cylinder microparticle generation unit so that the microparticles are generated in the cylinder, when a flow amount of exhaust gas passing through the exhaust purification catalyst is larger than a predetermined determination flow amount, and/or when a temperature of the exhaust purification catalyst is lower than a determination temperature determined based on a catalyst activated temperature range of the exhaust purification catalyst.

When the flow amount of exhaust gas passing through the exhaust purification catalyst is large, or when the temperature of the exhaust purification catalyst is low, it is difficult to maintain the exhaust purification performance of the exhaust purification catalyst in the high state. Therefore, in this case, the in-cylinder microparticle generation unit is operated, and the amount of nanoparticles flowing into the exhaust purification catalyst is reduced. Thereby, in correspondence with the exhaust purification performance of the exhaust purification catalyst, the amount of nanoparticles flowing into the exhaust purification catalyst can be adjusted.

In still another manner of the above control device of the internal combustion engine, the microparticle control unit may include a microparticle supply device which is provided in an exhaust passage of the internal combustion engine, and which supplies, to the exhaust passage, microparticles having a capability of adsorbing the nanoparticles included in exhaust gas.

The control device of the internal combustion engine supplies, to the exhaust passage, the microparticles having the capability of adsorbing the nanoparticles included in the exhaust gas of the internal combustion engine. Thereby, the nanoparticles can be adsorbed by the microparticles supplied from the microparticle supply device to be aggregated. The efficiency of catching and collecting the nanoparticles with using the filter, which is conventionally difficult, can be enhanced. Thereby, it can be suppressed that the nanoparticles diffuse into the atmosphere. The microparticles may have a function to aggregate the nanoparticles.

In still another manner, the above control device of the internal combustion engine may further include an operation state detection unit which detects an operation state of the internal combustion engine, wherein the microparticle supply device supplies the microparticles to the exhaust passage, when the operation state detection unit detects a predetermined operation state. By operating the microparticle supply device and supplying the microparticles to the exhaust passage in the predetermined operation state of the internal combustion engine, the nanoparticles generated in the predetermined operation state can be adsorbed by the microparticles to be aggregated. In a preferred example, the predetermined operation state may be any one of a vehicle deceleration state, an accelerator OFF state, an engine revolution variation amount minus state, a brake ON state and an exhaust brake ON state.

In still another manner of the above control device of the internal combustion engine, the microparticle supply device may include: a microparticle generation device which always generates the microparticles; and a control valve which is arranged between the exhaust passage and the microparticle generation device, and supplies the microparticles to the exhaust passage by opening the control valve. Thereby, the response of the discharge of the microparticles to the exhaust passage to the control signal can be improved. In a preferred example, the microparticle supply device may generate and supply carbon microparticles as the microparticles.

According to another aspect of the present invention, there is provided an exhaust purification method of an internal combustion engine including a process which generates microparticles having a particle diameter larger than that of nanoparticles generated in the internal combustion engine, and supplies the generated microparticles to a space in which the nanoparticles exist or a passage in which the nanoparticles move to make the nanoparticles adsorbed by the microparticles.

In accordance with the exhaust purification method of the internal combustion engine of the present invention, since the nanoparticles can be adsorbed by the microparticles in the space in which the nanoparticles exist or the passage in which the nanoparticles move, the amount of nanoparticles discharged to the external can be reduced. Namely, by making the nanoparticles adsorbed by the microparticles having the diameter larger than that of the nanoparticles, the amount of discharged nanoparticles having the particle diameter of the nanoparticle size can be reduced. Since the particulate matters having a diameter larger than that of the nanoparticles can be caught and collected by the exhaust purification device such as a ceramic filter, by providing the exhaust purification device at the downstream position of the internal combustion engine, it can be suppressed that the nanoparticles are discharged into the atmosphere. As the space in which the nanoparticles exist is the inside of the cylinder, and the passage in which the nanoparticles move is the exhaust passage of the internal combustion engine, for example.

In the present invention, the microparticles mean the particulate matters having the diameter larger than that of the nanoparticles, and soot and soluble organic fraction (SOF) are included, for example.

BRIEF DESCRIPTION OF THE DRAWINGS

FIG. 4 is a flow chart showing a modification of the nanoparticle reduction process;

DETAILED DESCRIPTION OF THE PREFERRED EMBODIMENTS

In this specification, a word "particulate matter (PM)" is used irrespective of its particle diameter. "Nanoparticle" means the particulate matter having the particle diameter smaller than substantially 50 nm, and "microparticle" means the particulate matter having the particle diameter larger than substantially 50 nm. Namely, both of the nanoparticle and the microparticle are the particulate matters, and the microparticle means the particulate matter having the particle diameter larger than that of the nanoparticle. "Soot" and "carbon microparticle", which will be described in embodiments below, are ones of the above-mentioned microparticles.

The present invention is characterized in that discharging of the nanoparticles is suppressed by making the nanoparticles, having a small diameter and difficult to catch and collect with using the filter, adsorbed by the microparticles having the larger particle diameter to increase the diameter of the nanoparticles. In a first embodiment which will be explained below, the microparticles which adsorb the nanoparticles are generated in the internal combustion engine. Meanwhile, in a second embodiment, the microparticles are generated in an exhaust system of the internal combustion engine.

First Embodiment

Device Configuration

Figure 1:
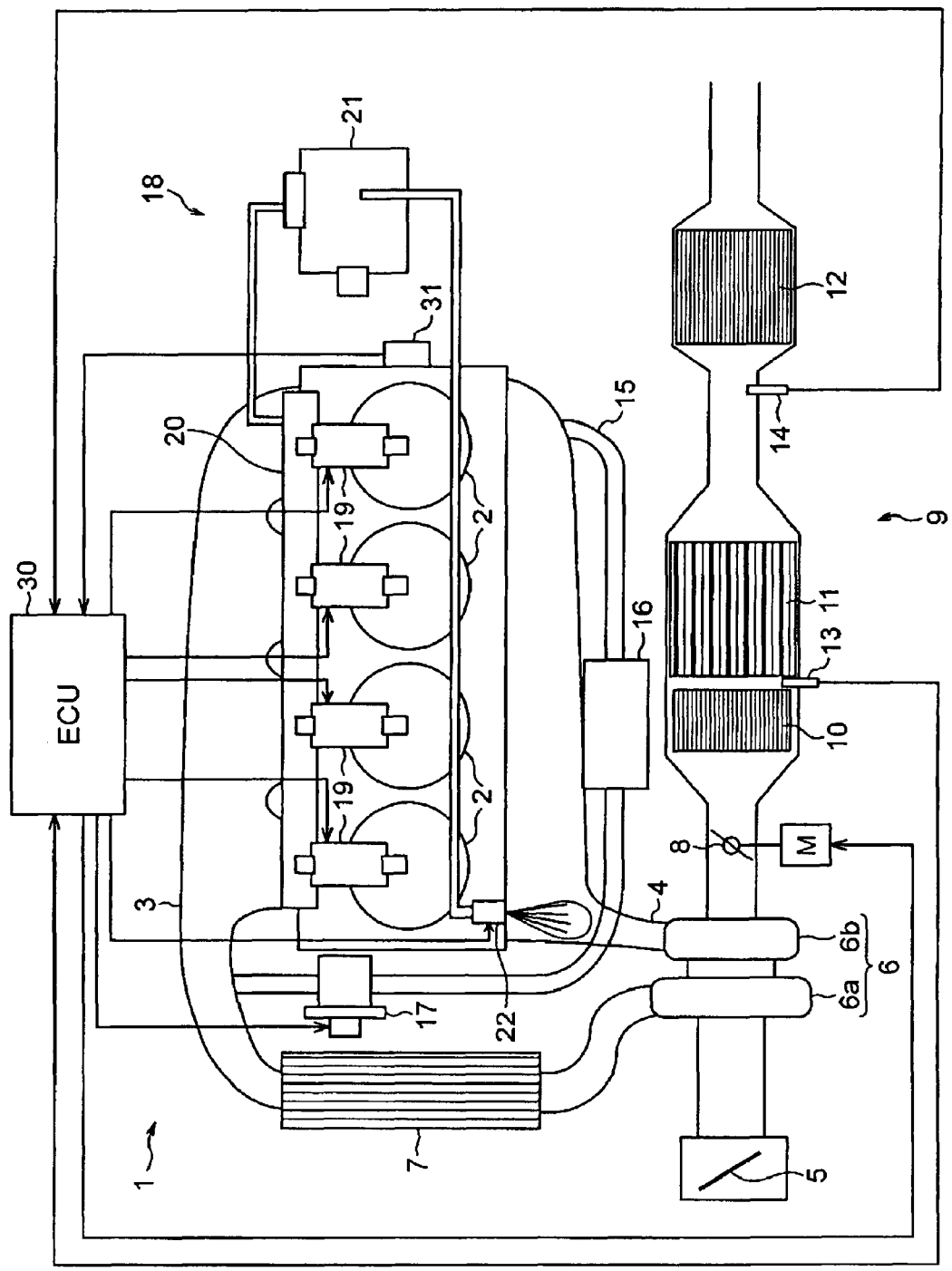
FIG. 1 is a configuration diagram of a control device of an internal combustion engine according to a first embodiment.

FIG. 1 shows an embodiment in which the control device of the present invention is applied to a diesel engine 1 being the internal combustion engine. The engine 1 is mounted on a vehicle as a traveling power source, and an intake passage 3 and an exhaust passage 4 communicate with cylinders 2. In the intake passage 3, a throttle valve 5 for adjusting an intake air amount, a compressor 6a of a turbo charger 6 and an intercooler 7 for cooling the intake air are provided. In the exhaust passage 4, a turbine 6b of the turbo charger 6, an exhaust throttle valve 8 for throttling the exhaust flow and an exhaust purification device 9 for purifying the exhaust gas are provided. The exhaust purification device 9 includes a NOx storage reduction catalyst 10, a particulate filter 11 and an oxidation catalyst 12 serving as an exhaust purification catalyst having an oxidizing capability. In addition, the exhaust purification device 9 includes a temperature sensor 13 for outputting a signal corresponding to the temperature of the exhaust gas and an A/F sensor 14 for outputting a signal corresponding to an air/fuel ratio of the exhaust gas. The exhaust passage 4 and the intake passage 3 communicate with each other via an EGR passage 15 which includes an EGR cooler 16 and an EGR valve 17.

In addition, the engine 1 includes a fuel supply device 18. The fuel supply device 18 includes injectors 19 serving as a fuel supply unit for injecting a fuel into each of the cylinders 2, a common rail 20 for storing the high pressure fuel which is injected from the injectors 19, and a fuel pump 21 for supplying the fuel to the common rail 20 from a fuel tank (not shown). Further, the fuel supply device 18 includes a fuel addition injector 22 for supplying the fuel to the exhaust passage 4.

The operations of the throttle valve 8, the EGR valve 17 and each of the injectors 19 are controlled by an engine control unit (ECU) 30. The ECU 30 is formed as a computer including a microprocessor and peripheral equipments such as a RAM and a ROM necessary for the operation, and is a known computer unit for controlling the operation state of the engine 1.

The ECU 30 calculates the fuel amount to be supplied to the cylinder 2 based on the operation state of the engine 1, and controls the operation of each of the injectors 19 so that the calculated fuel amount is injected into the cylinder 2. In addition, at the time of deceleration of the engine 1 and in such a case that the number of revolutions of the engine 1 is equal to or larger than the predetermined number of revolutions, the ECU 30 controls the operation of each of the injectors 19 so that the fuel supply to the cylinder 2 is stopped. That the ECU 30 makes the fuel supply to the cylinders 2 stopped at the time of the deceleration of the engine 1 is hereinafter referred to as "fuel cut". Moreover, the ECU 30 controls the opening degree of the EGR valve 17 so that the exhaust gas of the appropriate amount flows back to the intake passage 3 from the exhaust passage 4 in correspondence with the operation state of the engine 1. As a sensor which is referred to for executing the controls, a revolution number sensor 31 for outputting a signal corresponding to the number of revolutions of the engine 1, the temperature sensor 13 and the A/F sensor 14 are connected to the ECU 30, for example. Various kinds of components are also controlled by the ECU 30, but illustrations and explanations thereof are omitted here. Further, various kinds of sensors other than the above-mentioned sensors are provided in the engine 1, but the illustrations and explanations thereof are omitted.

(Nanoparticle Reduction Process)

At the time of the deceleration or idle operation of the engine 1, since the fuel supply amount to the cylinder 2 is reduced, the pressure of the cylinder 2 becomes low, and the lubricating oil amount sucked into the cylinder 2 increases. Therefore, the nanoparticle components derived from the lubricating oil may be generated in the cylinders 2. Hence, the ECU 30 executes the nanoparticle reduction process shown in FIG. 2 and reduces the amount of nanoparticles discharged from the cylinder 2 at the time of the deceleration or idle operation of the engine 1. The nanoparticle reduction process is repeatedly executed in a predetermined period during the operation of the engine 1. By executing the nanoparticle reduction process, the ECU 30 functions as an operation control unit of the present invention.

Figure 2:
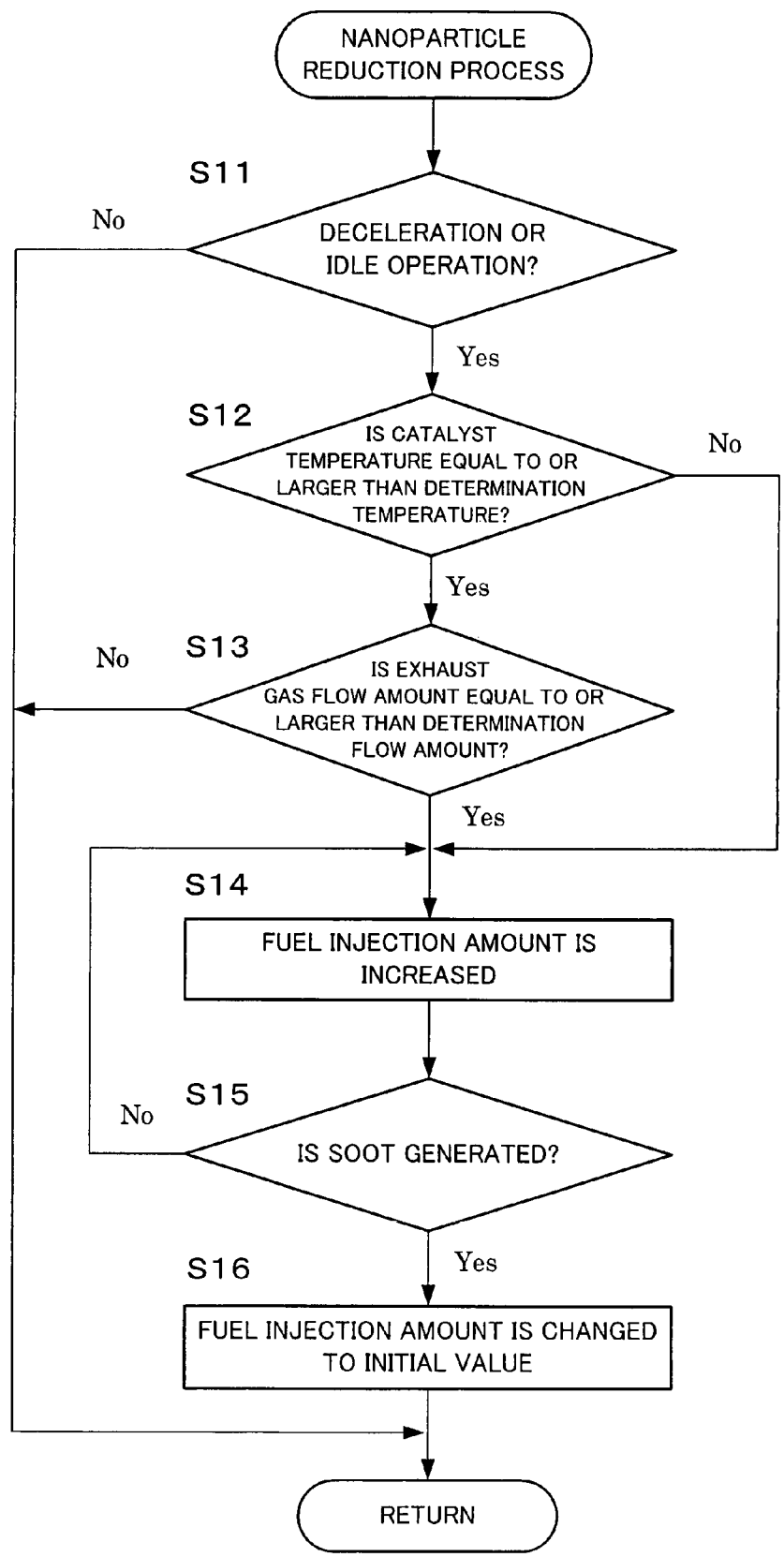
FIG. 2 is a flow chart of a nanoparticle reduction process.

In the nanoparticle reduction process shown in FIG. 2, first in step S11, the ECU 30 determines whether the operation state of the engine 1 is the deceleration or the idle operation. Based on the number of revolutions of the engine 1 and the accelerator opening degree, it is determined whether the operation state of the engine 1 is the deceleration or the idle operation. When the number of revolutions of the engine 1 is within the predetermined number of idling revolutions and the accelerator opening degree is 0%, i.e., when the accelerator is not stepped on, the ECU 30 determines that the operation state of the engine 1 is the idle operation. Meanwhile, when the number of revolutions of the engine 1 is larger than the predetermined number of revolutions (e.g., 1400 rpm) and the accelerator opening degree is 0%, the ECU 30 determines that the operation state of the engine 1 is the deceleration. When the variation of the number of revolutions of the engine 1 becomes minus, i.e., when the number of revolutions of the engine 1 is reduced, the ECU 30 may determine that the operation state of the engine 1 is the deceleration. When the variation of the torque of the engine 1 becomes minus, the ECU 30 may determine that the operation state of the engine 1 is the deceleration. Moreover, when a brake signal, showing that the brake (not shown) is stepped on, is set in an ON state, the ECU 30 may determine that the operation state of the engine 1 is the deceleration. When determining that the operation state of the engine 1 is neither the deceleration nor the idle operation, the ECU 30 ends the process.

On the other hand, when the ECU 30 determines that the operation state of the engine 1 is the deceleration or the idle operation, the process goes to step S12, and the ECU 30 determines whether or not the temperature of the oxidation catalyst 12 is lower than the predetermined determination temperature. The ECU 30 may obtain the temperature of the oxidation catalyst 12 by referring to the output signal of the temperature sensor 13, or may estimate it based on the number of revolutions of the engine 1 and the load. The predetermined determination temperature is appropriately set in accordance with the range of the catalyst activating temperature of the oxidation catalyst 12, and the minimum value of the range of the catalyst activating temperature is set, for example. When the ECU 30 determines that the temperature of the oxidation catalyst 12 is lower than the predetermined determination temperature, the process of step S13 is skipped, and the process goes to step S14. Meanwhile, when the ECU 30 determines that the temperature of the oxidation catalyst 12 is equal to or larger than the predetermined determination temperature, the process goes to step S13, and the ECU 30 determines whether or not the exhaust gas flow amount is equal to or larger than the predetermined determination flow amount. The exhaust gas flow amount is estimated based on the number of revolutions of the engine 1, the load and the EGR gas, for example. The predetermined determination flow amount is determined to the exhaust gas flow amount with which the exhaust gas flow amount passing through the oxidation catalyst 12 is so large that the exhaust purification performance of the oxidation catalyst 12 cannot be maintained at high performance level. When determining that the exhaust gas flow amount is smaller than the predetermined determination flow amount, the ECU 30 ends the nanoparticle reduction process.

When the ECU 30 determines that the exhaust gas flow amount is equal to or larger than the predetermined determination flow amount, the process goes to step S14. The ECU 30 increases the fuel amount to be supplied to the cylinder 2, and controls the operation of the injector 19 so that the increased fuel amount is supplied. The fuel amount to be supplied to the cylinder 2 is set based on the operation state of the engine 1, as described above. In this process, first, based on the operation state of the engine 1 at the time of execution start of the nanoparticle reduction process shown in FIG. 2, the fuel supply amount is calculated. Then, the calculated fuel supply amount is stored in the RAM provided in the ECU 30 as the initial value, and the fuel amount to be supplied to the cylinder 2 is increased by adding the predetermined increase amount to the initial value. The predetermined increase amount is set so that the torque generated in the engine 1 is maintained equal to or smaller than 0 when the increased fuel amount is supplied to the cylinder 2.

In subsequent step S15, the ECU 30 determines whether or not the soot being the microparticle is generated in the cylinder 2. Whether or not the soot is generated is determined by the fuel combustion in the cylinder 2, for example. When the fuel combusts in the cylinder 2, it is determined that the soot is generated. For example, when the ECU 30 executes the fuel cut, i.e., when the fuel supply amount is set to 0, the fuel supply amount to the cylinder 2 is gradually increased. When the fuel combusts in the cylinder 2, it is determined that the soot is generated. Concretely, the relation between the number of revolutions of the engine 1 and the minimum value of the fuel supply amount showing that the fuel combusts in the cylinder 2 is obtained in advance by an experiment, and is stored in the ROM provided in the ECU 30 as a map, for example. By referring to the map, the ECU 30 determines whether or not the soot is generated.

Figure 3A:
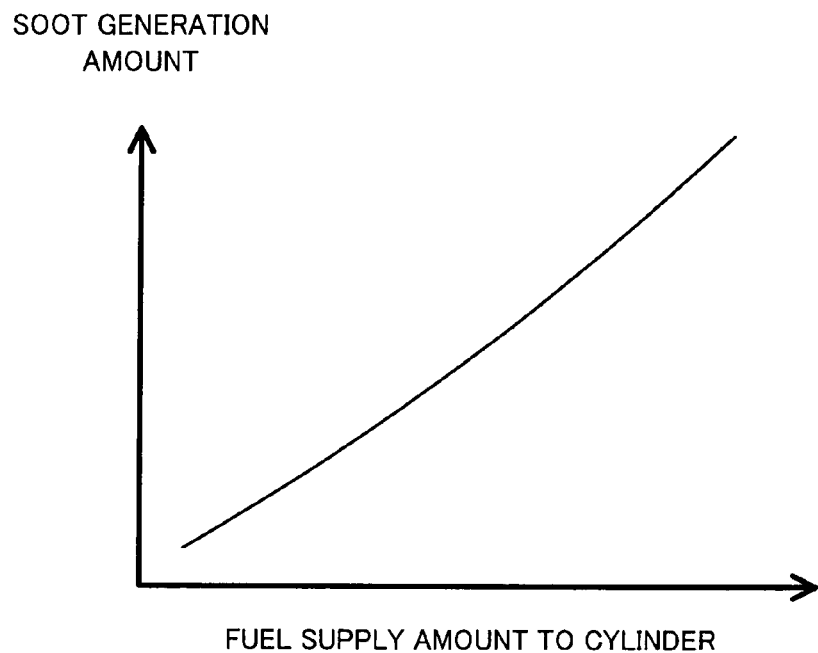
FIG. 3A is a graph showing a relation between a fuel supply amount to a cylinder and a soot generation amount.
Figure 3B:
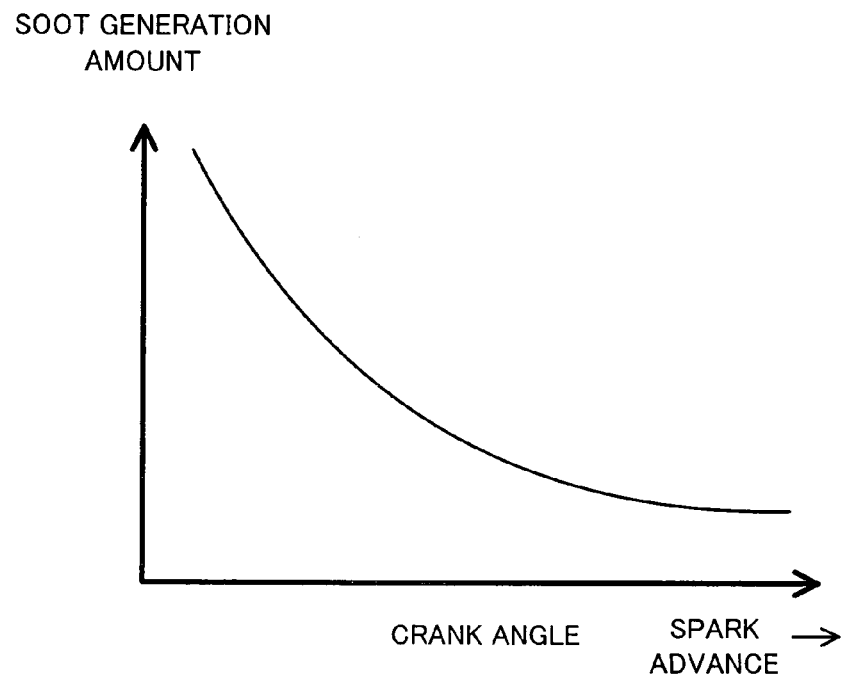
FIG. 3B is a graph showing an example of a relation between a fuel injection timing into the cylinder and the soot generation amount.

The soot generation amount has correlations with the fuel supply amount to the cylinder 2 and the injection timing, respectively. FIG. 3A shows an example of the relation between the fuel supply amount to the cylinder 2 and the soot generation amount, and FIG. 3B shows an example of the relation between the fuel injection timing to the cylinder 2 and the soot generation amount. In FIG. 3B, the fuel injection timing is shown by a crank angle. Thus, in such a state that the relations shown in FIGS. 3A and 3B are stored in the ROM provided in the ECU 30 as the map, the ECU 30 may refer to the map to determine whether or not the soot is generated. Further, a sensor for outputting the signal corresponding to the soot amount in the exhaust gas may be provided in the exhaust passage 4, and the ECU 30 may refer to the output signal to determine whether or not the soot is generated in the cylinder 2. As the sensor, there are a laser induced incandescence (LII) sensor and a photo acoustic spectroscopy (PAS) sensor, for example.

When the ECU 30 determines that the soot is not generated in the cylinder 2, the process returns to step S14, and the ECU 30 repeats steps S14 and S15. Meanwhile, when the ECU 30 determines that the soot is generated in the cylinder 2, the process goes to step S16, and the ECU 30 returns the fuel injection amount to the cylinder 2 to the initial value before increase. Afterward, the ECU 30 ends the nanoparticle reduction process.

As described above, in the nanoparticle reduction process shown in FIG. 2, since the soot is generated in the cylinder 2 as the microparticles at the time of the deceleration of the engine 1, by making the nanoparticles in the cylinder 2 adsorbed by the soot, the amount of nanoparticles discharged from the cylinder 2 can be reduced. In addition, since the pressure of the cylinder 2 can be increased by combusting the fuel in the cylinder 2, the amount of lubricating oil suction into the cylinder 2 can be reduced. Therefore, the generation amount of nanoparticle components derived from the lubricating oil can be reduced. In the nanoparticle reduction process shown in FIG. 2, when the exhaust gas flow amount is equal to or larger than the predetermined determination flow amount, and/or when the temperature of the oxidation catalyst 12 is lower than the predetermined determination temperature, the fuel is injected into the cylinder 2. Thus, the fuel consumption amount can be suppressed, and the amount of nanoparticles discharged from the cylinder 2 can be reduced.

By executing the process of step S11 and determining whether or not the nanoparticle components derived from the lubricating oil is generated in the cylinder 2, the ECU 30 functions as a state determination unit of the present invention. In addition, by supplying the fuel to the cylinder 2 from the injector 19 and generating the soot in the cylinder 2, the injector 19 functions as an in-cylinder microparticle generation unit of the present invention.

(Modification of Nanoparticle Reduction Process)

FIG. 4 shows a modification of the nanoparticle reduction process shown in FIG. 2. As the amount of lubricating oil suction into the cylinder 2 increases, the generation amount of nanoparticle components derived from the lubricating oil also increases, and the amount of nanoparticles generated in the cylinder 2 may increase. As described above, there is the correlation between the amount of nanoparticles generated in the cylinder 2 and the amount of lubricating oil suction into the cylinder 2, and there is the correlation between the amount of lubricating oil suction into the cylinder 2 and the deceleration degree of the engine 1. In this modification, the fuel supply amount, which is supplied to the cylinder 2 at the time of the deceleration of the engine 1, is varied in correspondence with the deceleration degree of the engine 1. In FIG. 4, the same reference numerals are given to the same processes as those of FIG. 2, and explanations thereof are omitted.

Figure 5:
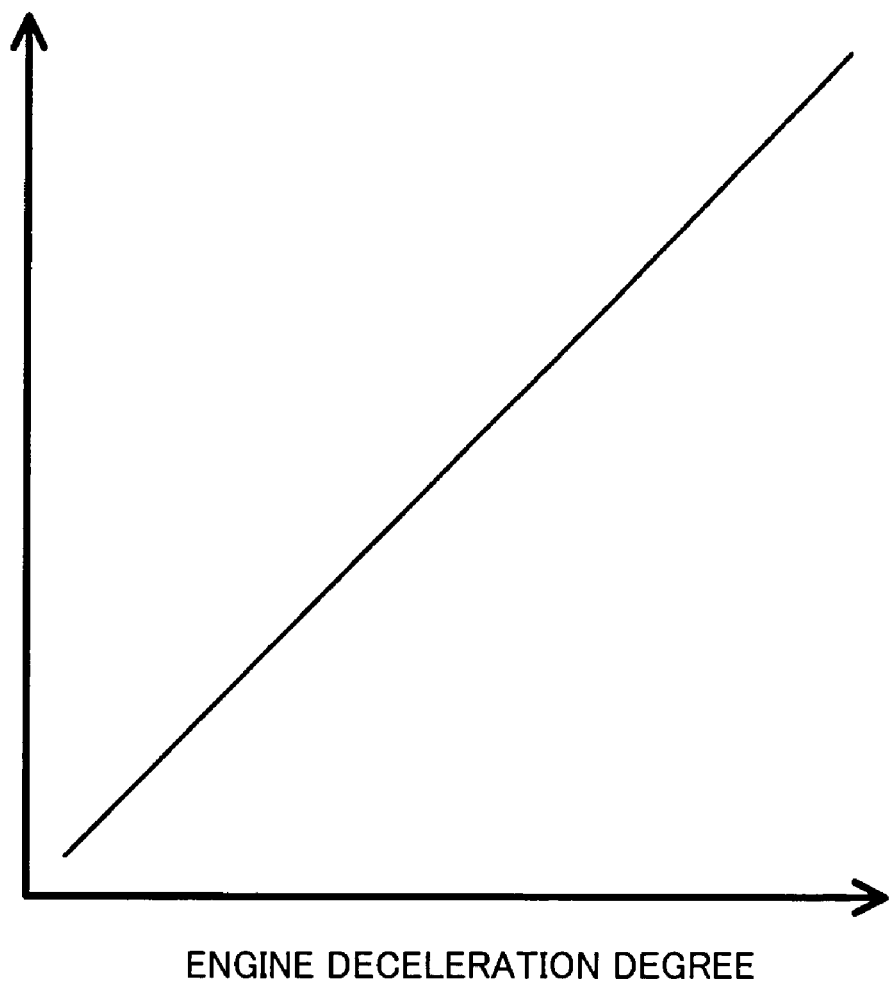
FIG. 5 is a graph showing an example of a relation between an engine deceleration degree and the fuel supply amount to the cylinder.

In the modification of the nanoparticle reduction process shown in FIG. 4, first, the ECU 30 executes the same process as steps S11 to S13 of the nanoparticle reduction process shown in FIG. 2. In subsequent step S21, the ECU 30 obtains the deceleration degree of the engine 1 based on the variation of the number of revolutions of the engine 1 at the time of the deceleration. In next step S22, the ECU 30 obtains the fuel supply amount supplied to the cylinder 2, based on the obtained deceleration degree of the engine 1. As the deceleration degree of the engine 1 becomes larger, the pressure of the cylinder 2 more easily becomes low. Thus, the lubricating oil is easily sucked into the cylinder 2. Therefore, it is estimated that the amount of lubricating oil suction into the cylinder 2 increases and the generation amount of nanoparticle components derived from the lubricating oil also increases. Hence, the ECU 30 refers to the map shown in FIG. 5 and obtains the fuel supply amount corresponding to the deceleration degree of the engine 1. FIG. 5 shows an example of the relation between the deceleration degree of the engine 1 and the fuel supply amount supplied to the cylinder 2. The relation is obtained in advance by an experiment, and is stored in the ROM provided in the ECU 30 as the map. The ECU 30 refers to the map shown in FIG. 5, and determines that, as the deceleration degree of the engine 1 becomes larger, the lubricating oil is easily sucked into the cylinder 2. Then, the ECU 30 estimates that the large amount of nanoparticle components derived from the lubricating oil are generated in the cylinder 2. Therefore, the ECU 30 refers to the map shown in FIG. 5 and increases the fuel supply amount supplied to the cylinder 2 as the deceleration degree of the engine 1 becomes larger. Namely, as the deceleration degree of the engine 1 becomes larger, the ECU 30 increases the amount of soot generated in the cylinder 2.

In next step S15, the ECU 30 determines whether or not the soot is generated in the cylinder 2. This determination method is same as that of the nanoparticle reduction process shown in FIG. 2. When the ECU 30 determines that no soot is generated in the cylinder 2, the process returns to step S21, and the ECU 30 repeats the process of steps S21, S22 and S15. Meanwhile, when the ECU 30 determines that the soot is generated, the process goes to step S23, the ECU 30 sets the fuel supply amount supplied to the cylinder 2 based on the number of revolutions of the engine 1. Afterward, the ECU 30 ends the nanoparticle reduction process shown in FIG. 4.

In the nanoparticle reduction process shown in FIG. 4, since the fuel supply amount supplied to the cylinder 2 is set in correspondence with the deceleration degree of the engine 1, the soot generation amount can be adjusted in correspondence with the nanoparticle generation amount. Hence, the surplus soot generation can be suppressed, and the soot amount discharged from the cylinder 2 can be reduced. In the process of step S22 shown in FIG. 4, when the ECU 30 determines the deceleration degree of the engine 1 and the deceleration degree is large, the ECU 30 determines that the lubricating oil is easily sucked into the cylinder 2. Instead, by providing pressure sensor for outputting the signal corresponding to the pressure of the cylinder 2 to each of the cylinders 2, based on the output signal of the pressure sensor, it may be determined whether or not the lubricating oil is easily sucked into the cylinder 2.

(Lubricating Oil Combustion Amount Reduction Process)

Figure 6:
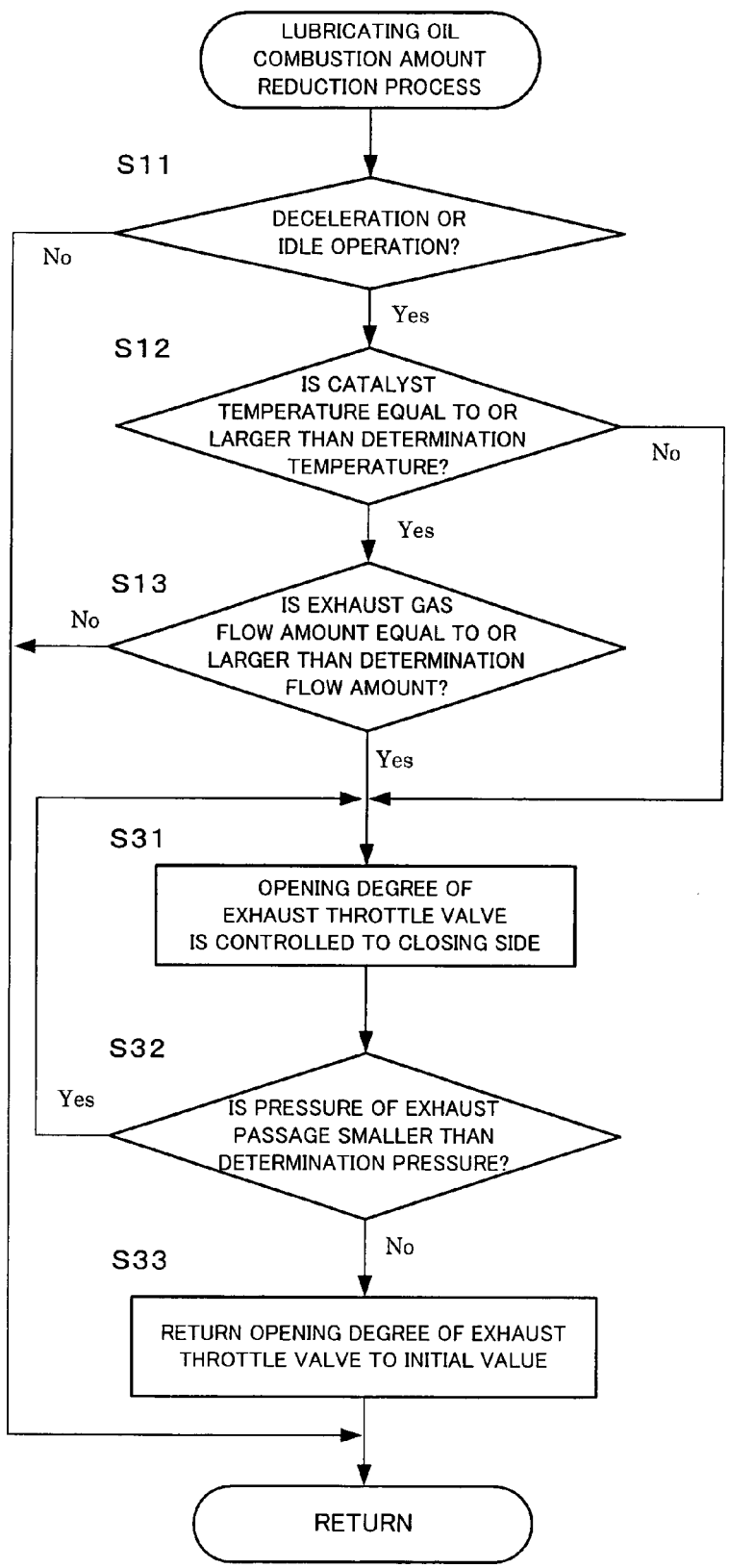
FIG. 6 is a flow chart of a lubricating oil combustion amount reduction process.

FIG. 6 shows a lubricating oil combustion amount reduction process, which is executed by the ECU 30 in order to reduce the amount of lubricating oil combustion in the cylinder 2. As the pressure of the cylinder 2 becomes lower, the lubricating oil is easily sucked into the cylinder 2. In this process, by increasing the pressure of the cylinder 2, the amount of lubricating oil suction into the cylinder 2 is reduced. In FIG. 6, the same reference numerals are given to the same processes as those of FIG. 2, and explanations thereof are omitted. The process shown in FIG. 6 is also repeatedly executed in a predetermined period during the operation of the engine 1.

In the process shown in FIG. 6, first, the ECU 30 executes the same process as steps S11 to S13 of the nanoparticle reduction process shown in FIG. 2. In subsequent step S31, the opening degree of the exhaust throttle valve 8 is controlled to the closing side by the ECU 30. At this time, the exhaust throttle valve 8 is controlled to the closing side by such an opening degree amount that the operation state of the engine 1 does not suddenly change. In next step S32, the ECU 30 determines whether or not the pressure of the exhaust passage 4 provided at the upstream position of the exhaust throttle valve 8 becomes equal to or larger than a predetermined determination pressure. As the predetermined determination pressure, the pressure at which the amount of lubricating oil suction into the cylinder 2 becomes 0 is set, for example. Since the pressure at which the amount of lubricating oil suction becomes 0 changes in correspondence with the operation state of the engine 1, the predetermined determination pressure may be changed in correspondence with the number of revolutions of the engine 1, for example. The pressure of the exhaust passage 4 may be detected by providing a sensor for outputting the signal corresponding to the pressure of the exhaust passage 4, or may be estimated based on the number of revolutions of the engine 1 and the fuel supply amount to the cylinder 2.

When the ECU 30 determines that the pressure of the exhaust passage 4 is smaller than the predetermined determination pressure, the process returns to step S31, and the ECU 30 repeats the process of steps S31 and S32. Meanwhile, when the ECU 30 determines that the pressure of the exhaust passage 4 is equal to or larger than the predetermined determination pressure, the process goes to step S33, and the opening degree of the exhaust throttle valve 8 is controlled to the open side by the ECU 30. Thereby, the opening degree returns to the opening degree (initial value) obtained before the opening degree of the exhaust throttle valve 8 is controlled to the closing side. Afterward, the ECU 30 ends the process shown in FIG. 6.

In the lubricating oil combustion amount reduction process shown in FIG. 6, at the time of the deceleration of the engine 1, the exhaust throttle valve 8 is controlled to the closing side, and the pressure of the exhaust passage 4 is increased. Then, the pressure of the cylinder 2 is increased. Thereby, since the amount of lubricating oil suction into the cylinder 2 can be reduced, the generation amount of nanoparticle components derived from the lubricating oil can be reduced, and the generation amount of nanoparticles can be reduced. By controlling the exhaust throttle valve 8 on the closing side at the time of the deceleration of the engine 1 and reducing the amount of lubricating oil combustion in the cylinder 2, the exhaust throttle valve 8 functions as a lubricating oil combustion amount reduction unit of the present invention.

The method of increasing of the pressure of the cylinder 2 is not limited to the above method of controlling the opening degree of the exhaust throttle valve 8 on the closing side. For example, by opening the EGR valve 17 and making the intake passage 3 and the exhaust passage 4 communicate with each other, the pressure of the intake passage 3 can be increased. Thereby, the reduction of the pressure of the cylinder 2 can be suppressed. In addition, at the time of the deceleration, at least one of the intake valve and the exhaust valve, which are provided in the cylinder 2, may be maintained in the opening state, and the reduction of the pressure of the cylinder 2 may be suppressed. In such a case that a variable nozzle is provided in the turbine 6b of the turbo charger 6, by controlling the variable nozzle on the closing side, the pressure of the exhaust passage 4 may be increased. When the reduction of the pressure of the cylinder 2 is suppressed in this manner, the EGR valve 17, the intake valve, the exhaust valve and the variable nozzle function as lubricating oil combustion amount reduction units of the present invention, respectively.

When the engine 1 includes an oil jet device for supplying the lubricating oil to the piston, the ECU 30 may stop the operation of the oil jet device at the time of the deceleration of the engine 1. By stopping the oil jet device at the time of the deceleration of the engine 1, the amount of lubricating oil suction into the cylinder 2 can be further reduced.

The nanoparticle reduction process shown in FIG. 2 and FIG. 4 and the lubricating oil combustion amount reduction process shown in FIG. 6 of the present invention may be separately executed, or may be executed in parallel. By executing the processes in parallel, the reduction of the effect of the engine brake at the time of the deceleration of the engine 1 can be suppressed, and the exhaust amount of nanoparticles can be reduced.

As described above, in accordance with the first embodiment, by generating the microparticles in the cylinder and making the nanoparticles adsorbed by the microparticles, the amount of nanoparticles discharged from the cylinder can be reduced. Therefore, it can be suppressed that the nanoparticles discharge into the atmosphere.

In the above embodiment, the microparticles for adsorbing the nanoparticles, such as the soot, are generated in the cylinder 2. However, the place in and to which the particulate matters are generated and supplied is not limited to the cylinder 2 of the engine 1 in the present invention. For example, the microparticles, generated at the outer part of the exhaust system of the engine 1, may be supplied to the exhaust system of the engine 1, which will be explained in details in the second embodiment, below.

Second Embodiment

Device Configuration

Next, a description will be given of the exhaust purification device according to the second embodiment of the present invention. The exhaust purification device according to the second embodiment generates the microparticles in the exhaust system of the internal combustion engine, and makes the nanoparticles adsorbed by them. Thereby, the discharge of the nanoparticles is suppressed.

Figure 7:
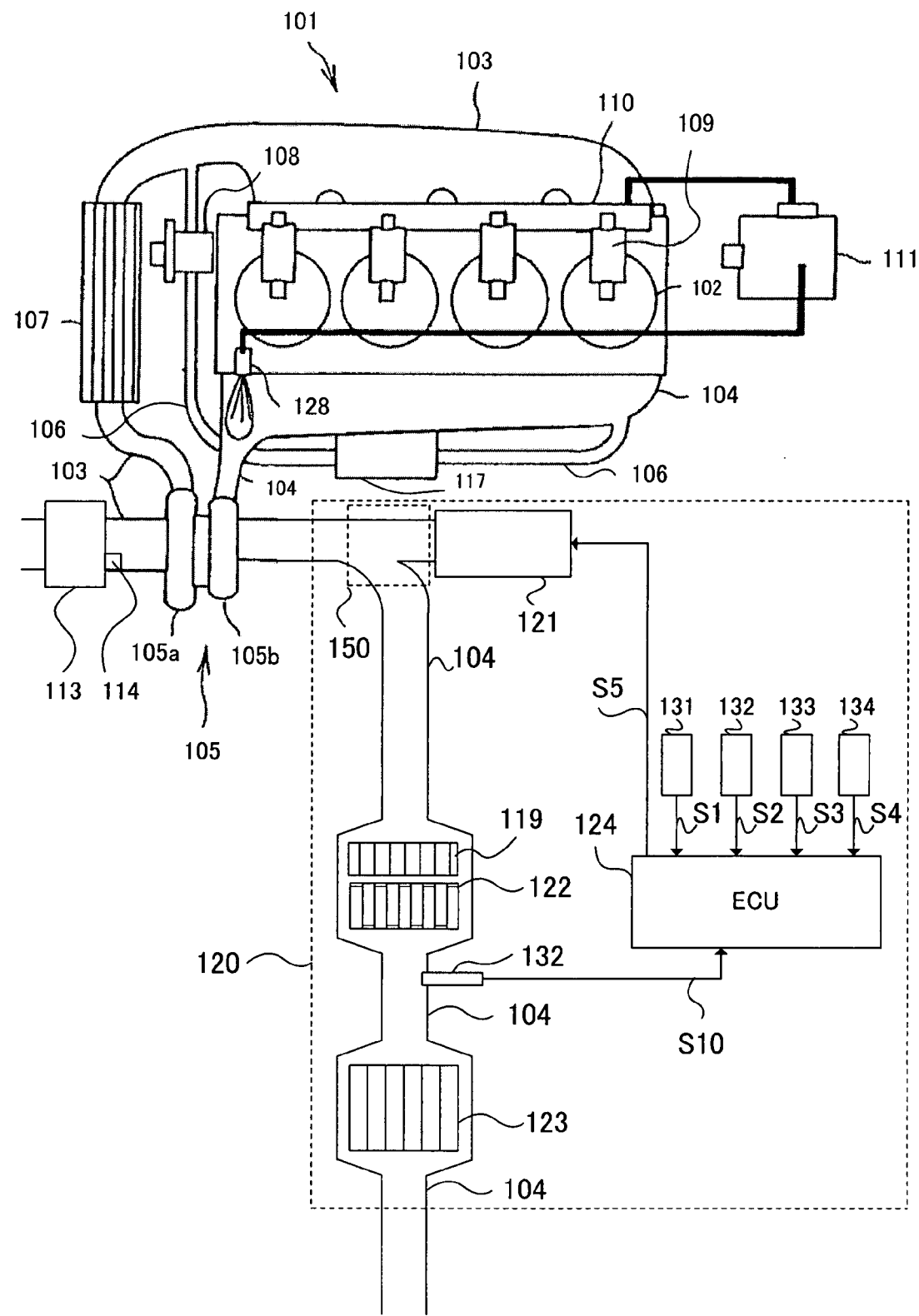
FIG. 7 is a schematic configuration diagram of an exhaust purification device according to a second embodiment.

FIG. 7 shows a schematic configuration of this embodiment in such a case that the exhaust purification device according to the present invention is applied to the internal combustion engine. An internal combustion engine 101 is a series 4-cylinder diesel engine in which four cylinders 102 are arranged in a row, and includes an intake passage 103, an exhaust passage 104 and a turbo charger 105 for executing supercharging to the internal combustion engine 101. The intake passage 103 includes an air filter 113, an air flow meter 114 for measuring intake flow amount, a compressor 105a of the turbo charger 105, and an inter cooler 107 for cooling the intake air compressed in the compressor 105a. The exhaust passage 104 includes the turbine 105b of the turbo charger 105 and an exhaust purification device 120 for reducing harmful matters in the exhaust gas.

The intake passage 103 and the exhaust passage 104 communicate with each other by the EGR passage 106, and the part of exhaust gas flows back to the intake passage 103 from the exhaust passage 104. The EGR passage 106 includes an EGR cooler 117 for cooling the exhaust gas flowing back to the intake passage 103, and an EGR valve 108 for adjusting the back flow amount of exhaust gas. In addition, the internal combustion engine 101 includes four injectors 109 corresponding to each of the cylinders 102. The four injectors 109 are connected to a common rail 110. The common rail 110 is connected to a supply pump 111 for pumping the fuel from a fuel tank (not shown) and supplying it to the common rail 110 by pressure.

The exhaust purification device 120 includes a NOx storage reduction catalyst 119, a filter 122 having a function to catch and collect PMs in the exhaust gas of the internal combustion engine 101, a carbon microparticle generation device 121, an oxidation catalyst 123 and an engine control unit (ECU) 124.

The carbon microparticle generation unit 121, which is provided on the upstream side of the filter 122, generates the carbon microparticles having the particle diameter larger than that of the nanoparticles, and discharges the generated carbon microparticles to the exhaust passage 104 from an outlet 150.

The carbon microparticles generated by the carbon microparticle generation device 121 are supplied to the exhaust passage 104 as the aerosol extremely similar to the PMs generated in the engine combustion process. The aerosol indicates such a state that the dispersion medium is the gas (e.g., exhaust gas) and the dispersed phase is the dispersed system of the solid (e.g., carbon microparticles) or the liquid. The microparticles of the dispersed phase (solid), which are easily aggregated by very active Brownian movement, are generally the unstable dispersed system, and have a characteristic of settling with time by the gravity. By introducing the carbon microparticles to the exhaust passage, the nanoparticles can be adsorbed by the carbon microparticles to be aggregated. Additionally, by arranging the filter 122 on the downstream side of the outlet 150 of the carbon microparticle generation device 121, the carbon microparticles adsorbing the nanoparticles can be easily caught and collected together with the nanoparticles by the filter 122. The carbon microparticle generation device 121 functions as a microparticle supply device of the present invention.

The oxidation catalyst 123 is provided on the downstream side of the filter 122, and oxidizes the PMs which are not caught and collected by the filter 122 and pass through the filter 122.

An A/F sensor 132 for detecting the air-fuel ratio of the exhaust gas is provided between the filter 122 and the oxidation catalyst 123, and a detecting signal S10 of the A/F sensor 132 is inputted into an ECU 124. In addition, the exhaust purification device 120 includes a fuel addition injector 128 for adding a reducing agent (fuel) to the exhaust passage 104, in order to reduce the NOx stored by the NOx storage reduction catalyst 119. The fuel addition injector 128 is connected to the supply pump 111. The fuel addition by the fuel addition injector 128 is controlled by the ECU 124 based on the input signal S10 from the A/F sensor 132, in accordance with necessity of reduction of the NOx stored by the NOx storage reduction catalyst 119.

The ECU 124 includes a CPU, a ROM, a RAM, an A/D converter and an input/output interface, which are not shown, and is electrically connected to an accelerator sensor 131, a brake sensor 132, a revolution speed sensor 133 and an exhaust brake sensor 134. The accelerator sensor 131, the brake sensor 132, the revolution speed sensor 133 and the exhaust brake sensor 134 supply, to the ECU 124, a detecting signal S1 showing stepping of an accelerator pedal (not shown), a detecting signal S2 showing stepping of a brake pedal (not shown), a detecting signal S3 showing engine revolution speed of the internal combustion engine 101, and a detecting signal S4 showing operation of the exhaust brake, respectively. The ECU 124 detects when the internal combustion engine 101 is in the accelerator OFF state, in the engine revolution variation amount minus state, in the brake ON state and in the exhaust brake ON state, based on the detecting signals S1, S2, S3 and S4 from the accelerator sensor 131, the brake sensor 132, the revolution speed sensor 133 and the exhaust brake sensor 134. This is because, when the operation state of the internal combustion engine 101 becomes the idle state or the vehicle deceleration state, the large amount of nanoparticles are particularly apt to be generated. Thus, when determining that the operation state of the internal combustion engine 101 is in the idle state or in the vehicle deceleration state, the ECU 124 guesses that the nanoparticles are generated in the exhaust gas, and supplies a control signal S5 to the carbon microparticle generation device 121 to discharge the carbon microparticles to the exhaust passage 104. Therefore, the accelerator sensor 131, the brake sensor 132, the revolution speed sensor 133 and the exhaust brake sensor 134 function as operation state detection units of the present invention.

Figure 8:
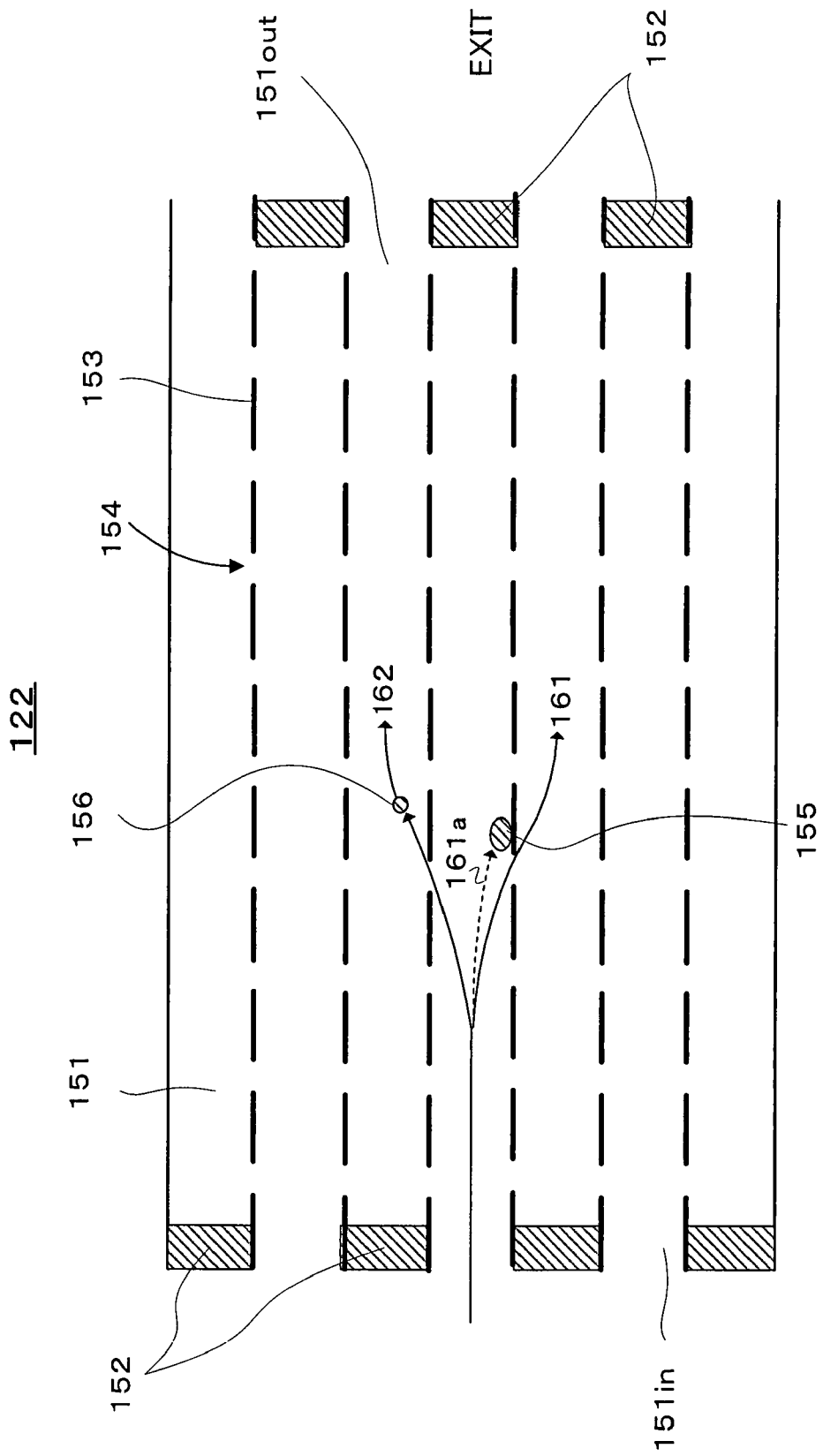
FIG. 8 is a diagram showing a configuration of a filter of the exhaust purification device.

FIG. 8 shows a cross-sectional view of the filter 122. The filter 122 is formed in a honeycomb shape having many cells (penetrating holes) 151. A plug 152 is inserted into one end of each cell 151. The cell 151 into which the plug 152 is inserted on the side of an entrance end 151 in and the cell 151 into which the plug 152 is inserted on the side of an exit end 151 out are alternately arranged. A bulkhead 153 is arranged between the neighboring cells 151, and many tiny openings are formed. The exhaust gas including microparticles 155 introduced to the entrance end 151 in of the filter 121 and nanoparticles 156 passes through the bulkheads 153 as shown by an arrow 161, and is introduced to the exit end 151 out. When the exhaust gas passes through the bulkheads 153, the microparticles 155 included in the exhaust gas follow a course shown by a broken line 161a by the inertia force to collide with the bulkheads 153. In this manner, by the inertia collide, the microparticles 155 are caught by the bulkheads 153. The bulkhead 153 holds the oxidation catalyst materials such as the platinum (Pt) and the cerium oxide ($CeO_2$), and the filter 122 has a function to promote the oxidation of the collected microparticles 155 by the operation of the oxidation catalyst materials. However, since the mass of the nanoparticle 156 is smaller than that of the microparticle 155, the inertia force of the nanoparticle 156 is also smaller. Therefore, as shown by an arrow 162, the nanoparticles 156 are not caught by the bulkheads 153. Namely, the nanoparticles 156 are introduced to the exit end 151 out with the exhaust gas, and sometimes pass through the filter 122. Hence, in the exhaust purification device of the present invention, by making the nanoparticles adsorbed by the carbon microparticles discharged from the carbon microparticle generation device 121 on the upstream side of the filter 122, the atmospheric diffusion of the nanoparticles can be suppressed. At the same time, the nanoparticles can be caught and collected with the carbon microparticles by the filter 122.

Figure 9:
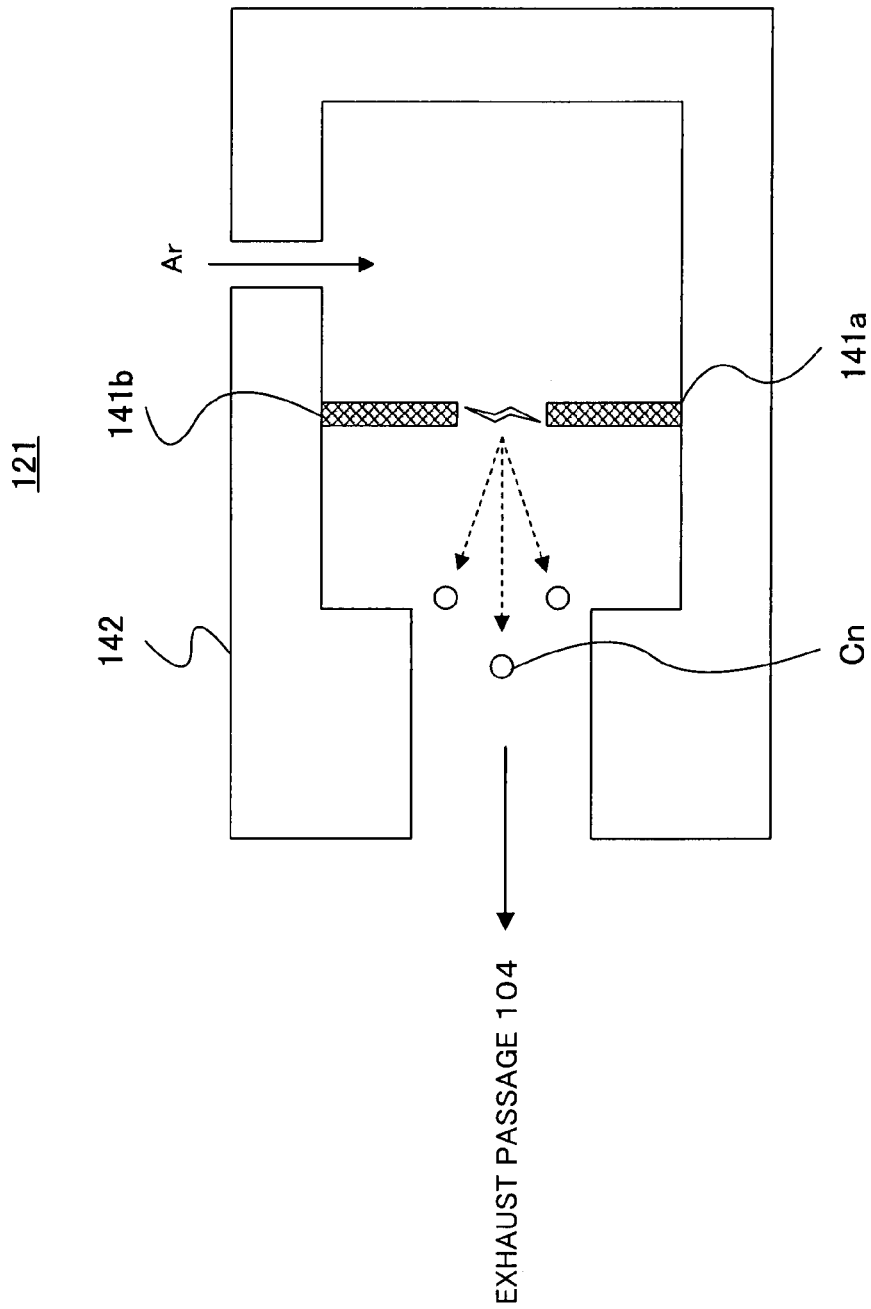
FIG. 9 is a diagram schematically showing a configuration of a carbon microparticle generation device.

FIG. 9 is a cross-sectional view showing an inner configuration of the carbon microparticle generation device 121. The carbon microparticle generation device 121 includes a container 142 having graphite electrodes 141a and 141b. By applying high voltage between the graphite electrodes 141a and 141b and generating corona discharge, the carbon microparticle generation device 121 generates the carbon microparticles Cn in the graphite electrodes 141a and 141b. In addition, the carbon microparticle generation device 121 has the gas flow communicating with the exhaust passage by the carrier gas flowing from the external. The carbon microparticles Cn generated in the graphite electrodes 141a and 141b are carried to the exhaust passage 104 with the carrier gas. The argon (Ar) is used as the carrier gas, for example. The magnitude of voltage applied between the graphite electrodes 141a and 141b is controlled by the control signal S5 from the ECU 124 shown in FIG. 7. When the control signal S5 is supplied, the carbon microparticle generation device 121 applies the voltage between the graphite electrodes 141a and 141b and starts the generation of the carbon microparticles Cn. Then, by varying the magnitude of voltage applied in accordance with the control signal S5, the generation amount of carbon microparticles Cn is adjusted. Namely, whether or not the carbon microparticle generation device 121 generates the carbon microparticles Cn is controlled by the control signal S5 from the ECU 124.

Figure 10:
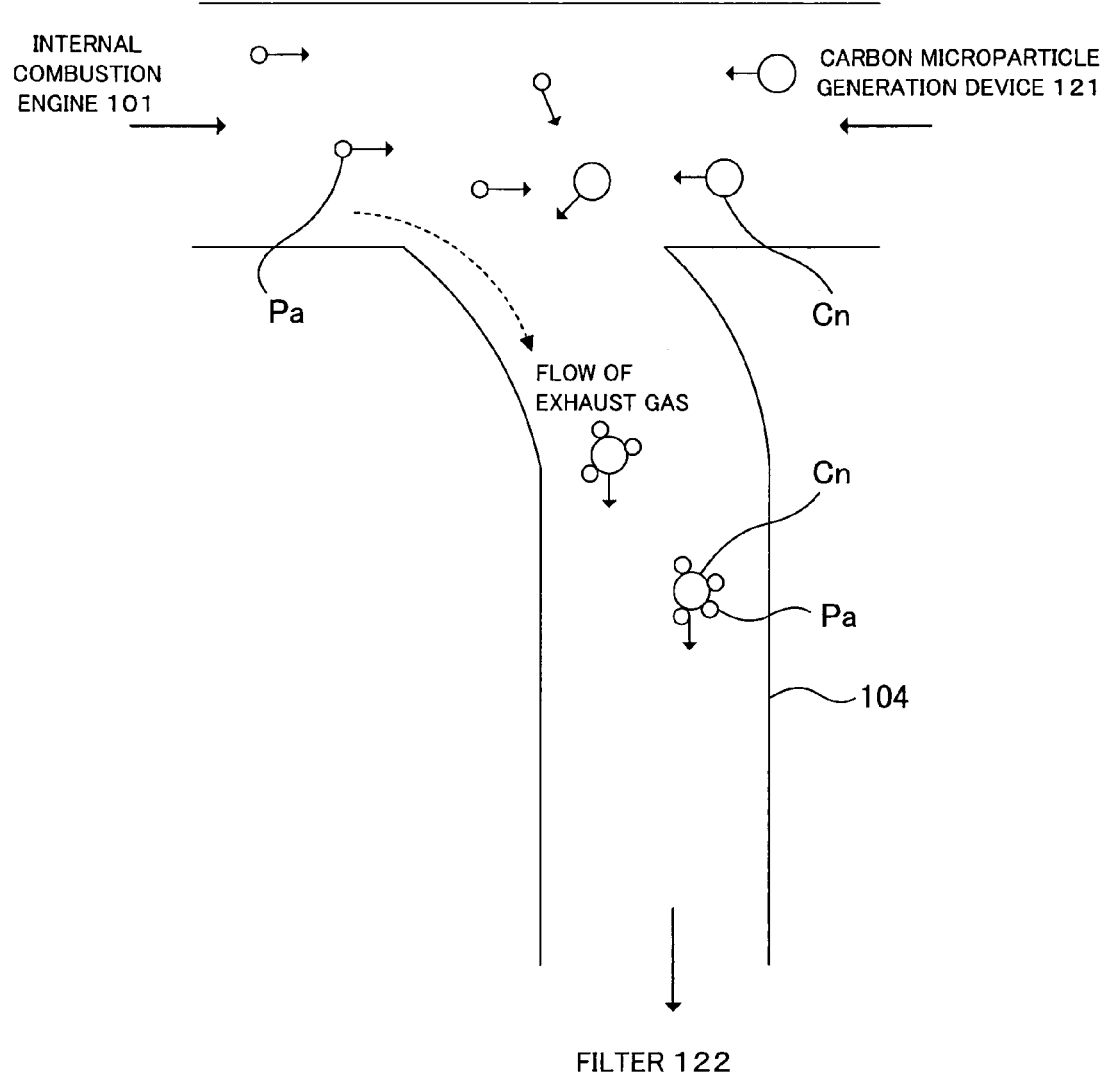
FIG. 10 is an enlarged diagram of an outlet of the carbon microparticle generation device in an exhaust passage.

FIG. 10 is an enlarged diagram of the outlet 150 of the carbon microparticle generation device 121. The carbon microparticles Cn generated by the carbon microparticle generation device 121 are carried to the exhaust passage 104 by the carrier gas, and are discharged into the exhaust gas flowing in the exhaust passage 104. Since the carbon microparticles have a characteristic of adsorbing the nanoparticles, the nanoparticles Pa in the exhaust gas are adsorbed by the discharged carbon microparticles Cn. The size of the carbon microparticles Cn generated by the carbon microparticle generation device 121 is larger than 50 nm. Meanwhile, the size of the nanoparticles Pa adsorbed by the carbon microparticles Cn is smaller than that of the carbon microparticles, generally speaking, substantially one-tenth the size of the carbon microparticles. Therefore, the plural nanoparticles Pa can be adsorbed by the single carbon micorparticle Cn. In this manner, the minimum nanoparticles, particularly equal to or smaller than 10 nm, can be effectively aggregated by the carbon microparticles.

The carbon microparticles Cn by which the nanoparticles Pa are adsorbed flow into the filter 122 on the downstream side with the exhaust gas. Since the size of the carbon microparticles Cn is larger than 50 nm, the filter 122 can catch and collect the carbon microparticles Cn. At this time, since the nanoparticles Pa are adsorbed by the carbon microparticles Cn, the filter 122 can catch and collect not only the carbon microparticles Cn but also the nanoparticles Pa.

(Modification of Exhaust Purification Device)

Figure 11:
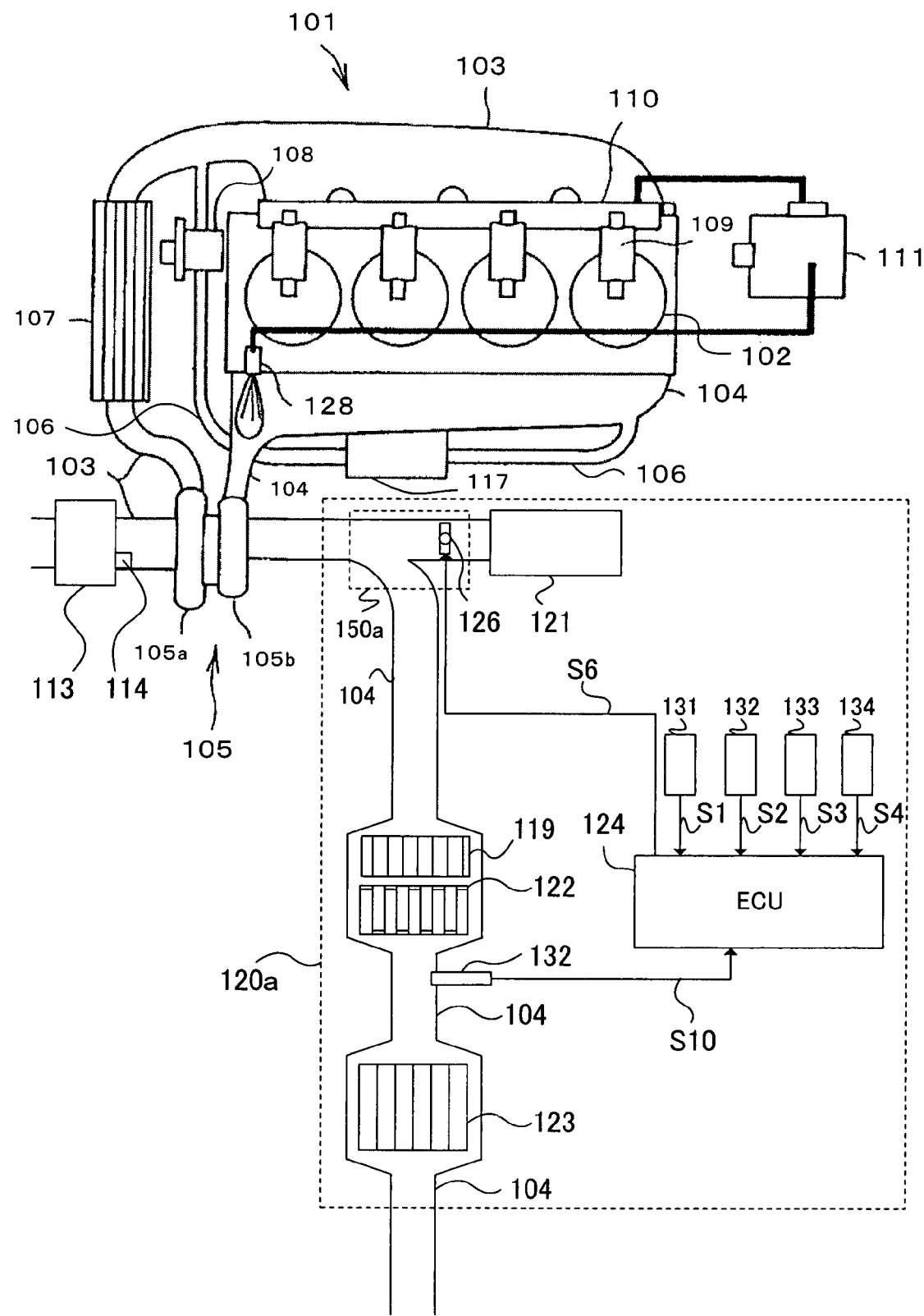
FIG. 11 is a schematic diagram of the exhaust purification device according to a modification.
Figure 12:
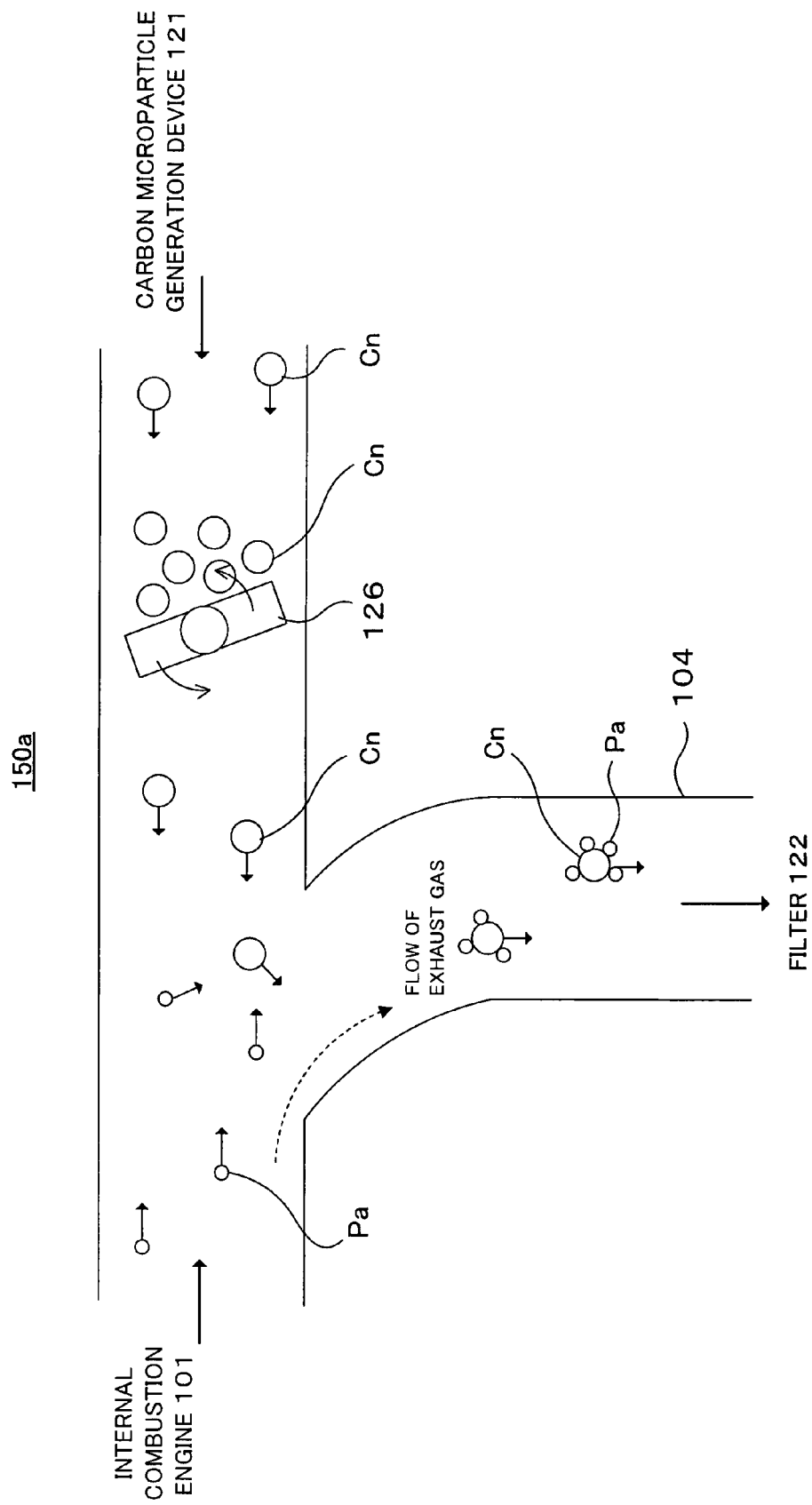
FIG. 12 is an enlarged diagram of the outlet of the carbon microparticle generation device in the exhaust passage.

Next, a description will be given of the exhaust purification device according to a modification according to a second embodiment of the present invention. FIG. 11 shows a schematic configuration of the second embodiment in which an exhaust purification device 120a according to the modification is applied to the internal combustion engine. FIG. 12 is an enlarged diagram of an outlet 150a of the carbon microparticle generation device 121. In the exhaust purification device 120a shown in FIG. 11, based on the control signal S5 from the ECU 124, the carbon microparticle generation device 121 controls whether or not the carbon microparticles are generated. Meanwhile, in the exhaust purification device 120a according to the modification, the carbon microparticle generation device 121 always operates and generates the carbon microparticles, which are dischargeable. A control valve 126 for adjusting the amount of carbon microparticles flowing into the exhaust passage 104 is provided at the outlet 150a of the carbon microparticle generation device 121. When the control valve 126 is closed, the carbon microparticles generated by the carbon microparticle generation device 121 are stayed by the control valve 126, and discharging of them into the outlet 150a is limited. As a result, the carbon microparticles are stored on the side of the carbon microparticle generation device 121 with respect to the control valve 126.

The control valve 126 is controlled by a control signal S6 from the ECU 124. When the control signal S6 from the ECU 124, which instructs discharging of the carbon microparticles Cn into the exhaust passage, is supplied to the control valve 126, the control valve 126 is opened. Then, the carbon microparticles Cn, discharging of which is limited by the control valve 126, are discharged into the exhaust passage 104. Hence, in the exhaust purification device 120a according to the modification, only by opening the control valve 126, the carbon microparticles Cn which are generated and stored in advance can be immediately discharged into the exhaust passage 104. Therefore, the time necessary for discharging of the carbon microparticles Cn into the exhaust passage can be shortened, as compared with the exhaust purification device 120 shown in FIG. 7. Namely, in the exhaust purification device 120a according to the modification, the response of discharging of the carbon microparticles in response to the control signal S6 from the ECU 124 can be improved.

(Carbon Microparticle Generation Control Process)

Next, a concrete description will be given of a carbon microparticle generation control process in the exhaust purification device of this embodiment in details, with reference to FIG. 13, in which the exhaust purification device 120 shown in FIG. 7 is used as an example. The ECU 124 executes the carbon microparticle generation control process in accordance with the program stored in a memory such as a ROM.

Figure 13:
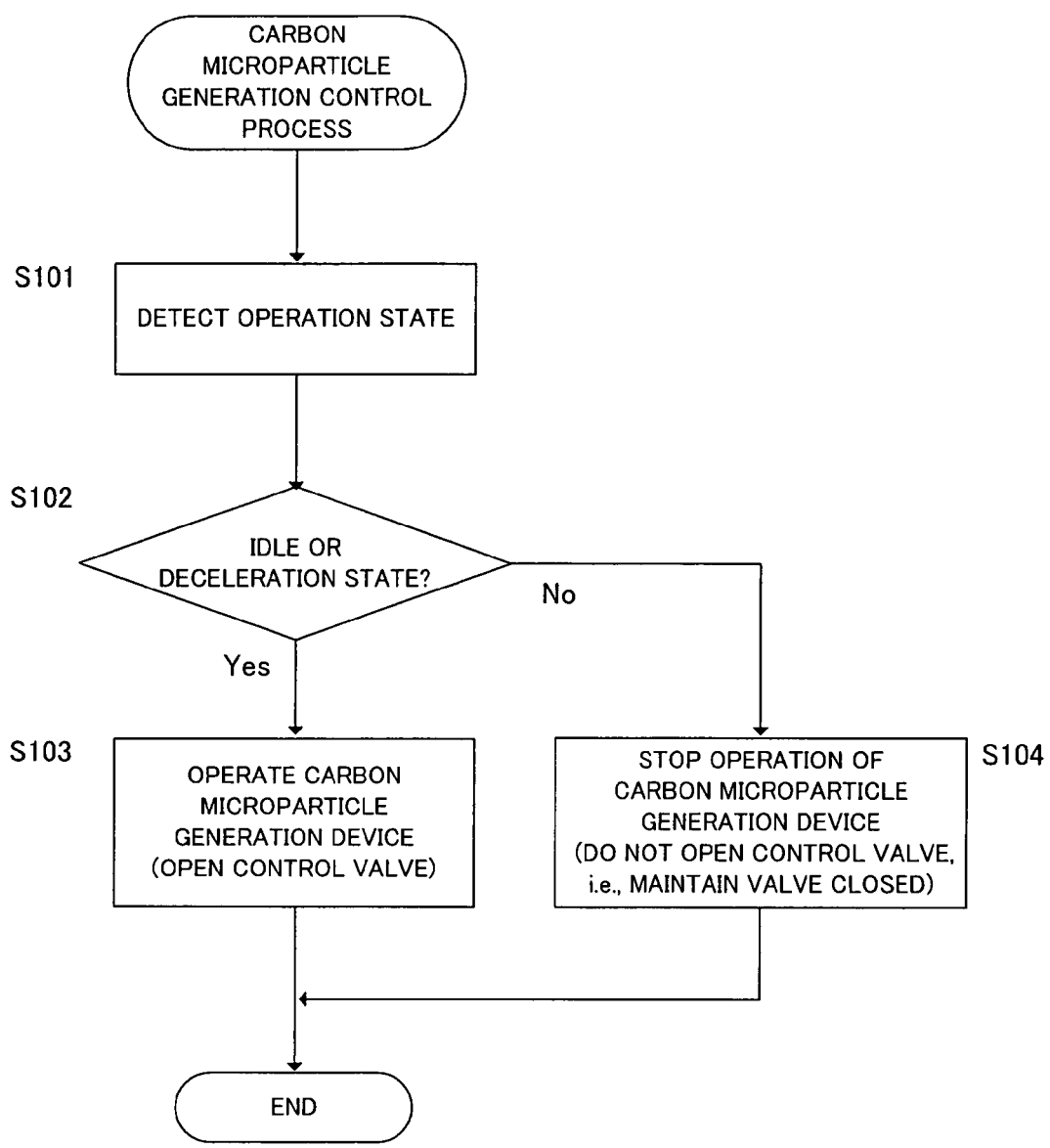
FIG. 13 is a flowchart of a carbon microparticle generation control process according to the second embodiment.

FIG. 13 is a flow chart of the carbon microparticle generation control process. In the carbon microparticle generation control process of the present invention, the nanoparticles, generated in the idle state or the vehicle deceleration state of the internal combustion engine 101, are adsorbed by the carbon microparticles to be aggregated, thereby increasing the diameter of the nanoparticles.

First, the ECU 124 detects the operation state of the internal combustion engine 101, base on the detecting signals S1, S2, S3 and S4 supplied from the accelerator sensor 131, the brake sensor 132, the revolution speed sensor 133 and the exhaust brake sensor 134, respectively (step S101). Next, based on the detected operation state, the ECU 124 determines whether the internal combustion engine 101 is in the idle state or in the vehicle deceleration state (step S102). Concretely, when, based on the detecting signals S1, S2, S3 and S4, the ECU 124 detects any one of the states: the accelerator OFF state; the engine revolution variation amount minus state; the brake ON state; and the exhaust brake ON state, it determines that the internal combustion engine 101 is in the idle state or in the vehicle deceleration state. If the internal combustion engine 101 is in the idle state or in the vehicle deceleration state (step S10; Yes), the ECU 124 supplies the control signal S5 for operation to the carbon microparticle generation device 121 (step S103). Thereby, the carbon microparticle generation device 121 starts the operation and generates the carbon microparticles to discharge them to the exhaust passage.

In this manner, the carbon microparticles discharged to the exhaust passage adsorb the nanoparticles and aggregate them. Meanwhile, when the detected operation state of the internal combustion engine 101 is neither the idle state nor the vehicle deceleration state (step S102; No), the ECU 124 supplies the control signal S5 to the carbon microparticle generation device 121 and stops it (step S104). Namely, when the carbon microparticle generation device 121 operates, the ECU 124 stops it. Meanwhile, when the carbon microparticle generation device 121 does not operate, the ECU 124 does not make it operate.

In the above carbon microparticle generation control process, the process in the case of using the exhaust purification device 120a according to the modification is shown in parentheses of steps S103 and S104 of the flow chart shown in FIG. 13. Namely, in step S103, by supplying the control signal S6 and opening the control valve 126, the ECU 124 discharges the carbon microparticles generated in advance. In step S104, by supplying the control signal S6 and closing the control valve 126, the ECU 124 stops discharging the carbon microparticles. In such a case that the control valve 126 is closed, the ECU 124 does not open the control valve 126 and maintains the closing state.

As described above, in accordance with the second embodiment, the nanoparticles are adsorbed by the microparticles supplied from the microparticle supply device to be aggregated. Thereby, the diameter of the nanoparticles can be increased, and the atmosphere diffusion can be suppressed. At the same time, the nanoparticles can be easily caught and collected by the filter.

[Modification]

The present invention is not limited to the above manners. Namely, the present invention may be applied to various kinds of manners. For example, the internal combustion engine to which the present invention is applied may be also applied to various kinds of internal combustion engines using gasoline and other fuels, without being limited to the diesel engine.

INDUSTRIAL APPLICABILITY

The present invention is usable for a vehicle and other devices, including an internal combustion engine generating particulate matters.

The invention claimed is:

1. A control device of an internal combustion engine, comprising a microparticle control unit which generates microparticles having a particle diameter larger than that of nanoparticles generated in the internal combustion engine, and supplies the generated microparticles to a space in which the nanoparticles exist or a passage in which the nanoparticles move to make the nanoparticles adsorbed by the microparticles,
   wherein the microparticle control unit includes an in-cylinder microparticle generation unit which generates the microparticles in a cylinder of the internal combustion engine at a time of deceleration or idle operation of the internal combustion engine,
   wherein the in-cylinder microparticle generation unit includes:
   a state determination unit which determines whether or not nanoparticle components derived from lubricating oil are generated in the cylinder at the time of the deceleration or idle operation of the internal combustion engine; and
   an operation control unit which operates the in-cylinder microparticle generation unit to generate the microparticles in the cylinder, when the state determination unit determines that the nanoparticle components derived from the lubricating oil are generated in the cylinder.

2. The control device of the internal combustion engine according to claim 1,
   wherein the state determination unit determines a deceleration degree of the internal combustion engine based on a variation of a number of revolutions of the internal combustion engine at the time of the deceleration of the internal combustion engine, and
   wherein the operation control unit operates the in-cylinder microparticle generation unit so that, as the deceleration degree determined by the state determination unit becomes larger, more microparticles are generated in the cylinder.

3. The control device of the internal combustion engine according to claim 1,
   wherein the state determination unit determines whether or not the lubricating oil is easily sucked into the cylinder at the time of the deceleration or idle operation of the internal combustion engine, and estimates that many nanoparticle components derived from the lubricating oil are generated in the cylinder when the state determination unit determines that the lubricating oil is easily sucked into the cylinder.

4. A control device of an internal combustion engine, comprising a microparticle control unit which generates microparticles having a particle diameter larger than that of nanoparticles generated in the internal combustion engine, and supplies the generated microparticles to a space in which the nanoparticles exist or a passage in which the nanoparticles move to make the nanoparticles adsorbed by the microparticles,
   wherein the microparticle control unit includes an in-cylinder microparticle generation unit which generates the microparticles in a cylinder of the internal combustion engine at a time of deceleration or idle operation of the internal combustion engine,
   wherein the in-cylinder microparticle generation unit includes a fuel supply unit which supplies fuel to the cylinder.

5. The control device of the internal combustion engine according to claim 1, further comprising a lubricating oil combustion amount reduction unit which reduces an amount of lubricating oil combustion in the cylinder,
   wherein the operation control unit controls operation of the lubricating oil combustion amount reduction unit to reduce the amount of lubricating oil combustion in the cylinder at the time of the deceleration or idle operation of the internal combustion engine.

6. The control device of the internal combustion engine according to claim 1,
wherein an exhaust purification catalyst having an oxidizing capability is provided in an exhaust passage of the internal combustion engine, and
wherein, at the time of the deceleration or idle operation of the internal combustion engine, the operation control unit operates the in-cylinder microparticle generation unit so that particulate matters are generated in the cylinder, when a flow amount of exhaust gas passing through the exhaust purification catalyst is larger than a predetermined determination flow amount, and/or when a temperature of the exhaust purification catalyst is lower than a determination temperature determined based on a catalyst activating temperature range of the exhaust purification catalyst.

7. A control device of an internal combustion engine, comprising a microparticle control unit which generates microparticles having a particle diameter larger than that of nanoparticles generated in the internal combustion engine, and supplies the generated microparticles to a space in which the nanoparticles exist or a passage in which the nanoparticles move to make the nanoparticles adsorbed by the microparticles,
wherein the microparticle control unit includes an in-cylinder microparticle generation unit which generates the microparticles in a cylinder of the internal combustion engine at a time of deceleration or idle operation of the internal combustion engine,
wherein the microparticle control unit includes a microparticle supply device which is provided in an exhaust passage of the internal combustion engine, and which supplies, to the exhaust passage, microparticles having a capability of adsorbing the nanoparticles included in exhaust gas.

8. The control device of the internal combustion engine according to claim 7, wherein the microparticle has a function to aggregate the nanoparticles.

9. The control device of the internal combustion engine according to claim 7, further comprising an operation state detection unit which detects an operation state of the internal combustion engine,
wherein the microparticle supply device supplies the microparticles to the exhaust passage, when the operation state detection unit detects a predetermined operation state.

10. The control device of the internal combustion engine according to claim 9,
wherein the operation state detection unit detects any one of a vehicle deceleration state, an accelerator OFF state, an engine revolution variation amount minus state, a brake ON state and an exhaust brake ON state, as the predetermined operation state.

11. The control device of the internal combustion engine according to claim 7, wherein the microparticle supply device includes:
a microparticle generation device which always generates the microparticles; and
a control valve which is arranged between the exhaust passage and the microparticle generation device, and supplies the microparticles to the exhaust passage by opening the control valve.

12. The control device of the internal combustion engine according to claim 7, wherein the microparticle supply device generates and supplies carbon microparticles as the microparticles.

13. An exhaust purification method of an internal combustion engine comprising:
a process which generates microparticles, having a particle diameter larger than that of nanoparticles generated in the internal combustion engine, in a cylinder of the internal combustion engine at a time of deceleration or idle operation of the internal combustion engine; and
a process which supplies the generated microparticles to a space in which the nanoparticles exist or a passage in which the nanoparticles move to make the nanoparticles adsorbed by the microparticles,
determining whether or not nanoparticle components derived from lubricating oil are generated in the cylinder at the time of the deceleration or idle operation of the internal combustion engine; and
generating the microparticles in the cylinder, when it is determined that the nanoparticle components derived from the lubricating oil are generated in the cylinder.

* * * * *